United States Patent
Serencsits et al.

(10) Patent No.: US 12,552,113 B2
(45) Date of Patent: Feb. 17, 2026

(54) BLADE STRINGER FORMING METHODS AND TOOLING

(71) Applicant: The Boeing Company, Arlington, VA (US)

(72) Inventors: William L Serencsits, Hollywood, SC (US); Jessica Offutt Fry, Charleston, SC (US); Justin Albright, La Mirada, CA (US)

(73) Assignee: The Boeing Company, Arlington, VA (US)

( * ) Notice: Subject to any disclaimer, the term of this patent is extended or adjusted under 35 U.S.C. 154(b) by 294 days.

(21) Appl. No.: 18/500,440

(22) Filed: Nov. 2, 2023

(65) Prior Publication Data
US 2024/0269945 A1 Aug. 15, 2024

Related U.S. Application Data

(60) Provisional application No. 63/484,128, filed on Feb. 9, 2023.

(51) Int. Cl.
*B29C 33/18* (2006.01)
*B29C 33/02* (2006.01)
(Continued)

(52) U.S. Cl.
CPC .............. *B29C 70/48* (2013.01); *B29C 33/02* (2013.01); *B29C 33/18* (2013.01); *B29C 33/202* (2013.01);
(Continued)

(58) Field of Classification Search
CPC ......... B29C 70/00; B29C 33/02; B29C 33/04; B29C 33/046; B29C 33/048
See application file for complete search history.

(56) References Cited

U.S. PATENT DOCUMENTS 7,588,655 B2 * 9/2009 Pham ...................... B29C 43/12
156/227
7,588,711 B2 * 9/2009 Depase .............. B29D 99/0014
264/297.6
(Continued)

FOREIGN PATENT DOCUMENTS

| CN | 115008787 A | * 9/2022 | ............. B29C 33/00 |
| DE | 102007015519 A1 | * 10/2008 | ........... B29C 33/305 |
| EP | 3398759 B1 | 11/2018 | |

OTHER PUBLICATIONS

Extended European Search Report, dated Oct. 1, 2024, regarding EP Application No. 24151905.7, 16 pages.
(Continued)

Primary Examiner — Atul P. Khare
(74) Attorney, Agent, or Firm — Yee & Associates, P.C.

(57) ABSTRACT

A first cut and kitted material is held against a first flange face of a first die. A second cut and kitted material is held against a second flange face of a second die. The method simultaneously forms the first cut and kitted material against a first blade face of the first die and the second cut and kitted material against a second blade face of the second die. The first cut and kitted material and the second cut and kitted material are clamped between the first die and the second die after forming the first cut and kitted material and the second cut and kitted material. A composite stringer preform comprising the first cut and kitted material, the second cut and kitted material, a noodle, and a base material is cured while the composite stringer preform is against the first forming surface and the second forming surface.

35 Claims, 23 Drawing Sheets

(51) Int. Cl.
  B29C 33/20 (2006.01)
  B29C 70/34 (2006.01)
  B29C 70/48 (2006.01)
  B29C 70/54 (2006.01)
  B29D 99/00 (2010.01)
  *B29K 105/06* (2006.01)
  *B29K 105/08* (2006.01)
  *B29L 31/30* (2006.01)

(52) U.S. Cl.
  CPC .......... B29C 70/345 (2013.01); B29C 70/543 (2013.01); B29D 99/0003 (2013.01); *B29K 2105/0872* (2013.01); *B29L 2031/3082* (2013.01)

(56) References Cited

U.S. PATENT DOCUMENTS

| | | | |
|---|---|---|---|
| 8,043,554 B2 | 10/2011 | Yip et al. | |
| 8,555,945 B2 * | 10/2013 | Torres Martinez | ... B29C 70/446 425/347 |
| 9,149,990 B2 * | 10/2015 | Lengsfeld | ............... B29C 35/02 |
| 9,676,147 B2 * | 6/2017 | Míguez | ................... B64C 1/064 |
| 10,864,688 B2 * | 12/2020 | Shinozaki | ............... B29C 43/58 |
| 10,921,210 B2 * | 2/2021 | Dull | ........................ B29C 70/44 |
| 11,135,789 B2 * | 10/2021 | Coxon | ............... B29D 99/0003 |
| 11,794,376 B2 * | 10/2023 | Kendall | ................ B29C 70/521 |
| 2009/0320995 A1 | 12/2009 | Menendez Martin et al. | |
| 2012/0258276 A1 | 10/2012 | Modin et al. | |
| 2013/0240150 A1 | 9/2013 | Suzuki et al. | |
| 2017/0120541 A1 | 5/2017 | Chapman et al. | |
| 2019/0030842 A1 * | 1/2019 | Miranda | ................. B29C 70/44 |
| 2019/0329509 A1 | 10/2019 | Coxon et al. | |
| 2022/0080649 A1 | 3/2022 | Plummer et al. | |
| 2024/0269944 A1 * | 8/2024 | Serencsits | ............... B29C 70/44 |

OTHER PUBLICATIONS

European Patent Office Action, dated Apr. 30, 2025, regarding EP Application No. 24151929.7, 5 pages.

Partial European Search Report, dated Jul. 8, 2024, regarding EP Application No. 24151905.7, 16 pages.

* cited by examiner

FROM FIG. 18A

```
┌─────────────────────────────────────────────────┐
│ CURING A COMPOSITE STRINGER PREFORM COMPRISING THE │
│ FIRST CUT AND KITTED MATERIAL, THE SECOND CUT AND │──1810
│ KITTED MATERIAL, A NOODLE, AND A BASE MATERIAL WHILE │
│ THE COMPOSITE STRINGER PREFORM IS AGAINST THE FIRST │
│ FORMING SURFACE AND THE SECOND FORMING SURFACE │
└─────────────────────────────────────────────────┘
```

1820 — WHEREIN INFUSING RESIN COMPRISES INTRODUCING RESIN TO A CURING CHAMBER BETWEEN THE BASE MATERIAL AND A TOOL LID OF THE CURING CHAMBER, AND FORCING THE RESIN INTO THE BASE MATERIAL AS THE TOOL LID MOVES TOWARDS THE BASE MATERIAL

1822 — WHEREIN SIMULTANEOUSLY FORMING THE FIRST CUT AND KITTED MATERIAL AGAINST THE FIRST BLADE FACE AND THE SECOND CUT AND KITTED MATERIAL AGAINST THE SECOND BLADE FACE COMPRISES MOVING A FORMING DEVICE BETWEEN THE FIRST DIE AND THE SECOND DIE

1824 — WHEREIN SIMULTANEOUSLY FORMING THE FIRST CUT AND KITTED MATERIAL AGAINST THE FIRST BLADE FACE AND THE SECOND CUT AND KITTED MATERIAL AGAINST THE SECOND BLADE FACE COMPRISES HEATING THE FIRST CUT AND KITTED MATERIAL AND THE SECOND CUT AND KITTED MATERIAL TO A NUMBER OF TEMPERATURES IN THE RANGE OF 120 DEGREES FAHRENHEIT TO 350 DEGREES FAHRENHEIT

1826 — WHEREIN CLAMPING THE FIRST CUT AND KITTED MATERIAL AND THE SECOND CUT AND KITTED MATERIAL COMPRISES MOVING AT LEAST ONE OF THE FIRST DIE OR THE SECOND DIE TOWARDS THE OTHER THE FIRST DIE OR THE SECOND DIE

1828 — WHEREIN CURING THE COMPOSITE STRINGER PREFORM COMPRISES HEATING THE COMPOSITE STRINGER PREFORM TO A TEMPERATURE IN THE RANGE OF 250 DEGREES FAHRENHEIT AND 400 DEGREES FAHRENHEIT

END

FIG. 18B

FROM FIG. 19A

```
┌─────────────────────────────────────────────────┐
│ CURING A COMPOSITE STRINGER PREFORM COMPRISING  │
│ THE FIRST CUT AND KITTED MATERIAL, THE SECOND CUT│──1912
│ AND KITTED MATERIAL, THE NOODLE, AND THE BASE   │
│ MATERIAL WHILE THE COMPOSITE STRINGER PREFORM   │
│ IS AGAINST THE FIRST DIE AND THE SECOND DIE     │
└─────────────────────────────────────────────────┘
```

1920 — WHEREIN INFUSING RESIN COMPRISES SENDING RESIN INTO THE CURING CHAMBER THROUGH RESIN INLETS IN THE TOOL LID

1922 — WHEREIN CURING THE COMPOSITE STRINGER PREFORM COMPRISES HEATING THE COMPOSITE STRINGER PREFORM TO A TEMPERATURE IN THE RANGE OF 250 DEGREES FAHRENHEIT AND 400 DEGREES FAHRENHEIT

1924 — HEATING THE FIRST CUT AND KITTED MATERIAL AND THE SECOND CUT AND KITTED MATERIAL TO A NUMBER OF TEMPERATURES IN THE RANGE OF 120 DEGREES FAHRENHEIT TO 350 DEGREES FAHRENHEIT AS THE FORMING DEVICE MOVES BETWEEN THE FIRST DIE AND THE SECOND DIE

1926 — COMPACTING THE BASE MATERIAL AND THE NOODLE BY APPLYING PRESSURE USING A TOOL LID AND HEATING THE BASE MATERIAL AND THE NOODLE

END

FIG. 19B

BLADE STRINGER FORMING METHODS AND TOOLING

CROSS-REFERENCE TO RELATED APPLICATION

This application claims the benefit of U.S. Provisional Patent Application Ser. No. 63/484,128, filed Feb. 9, 2023, and entitled "Blade Stringer Forming Methods and Tooling," which is incorporated herein by reference in its entirety.

BACKGROUND INFORMATION

1. Field

The present disclosure relates generally to forming composite structures and more specifically to forming and curing composite blade stringers.

2. Background

In manufacturing composite structures, the material stock is provided in flat sheets. The material stock is formed to bring the material into shape. After forming the material into a shape for a part, the part is exposed to elevated temperature and pressure for curing. In some examples, for dry materials, resin is infused in the dry fiber prior to curing.

Current manufacturing processes utilize multiple tools. Some tools are used for forming, while other tools are used for curing. In some examples, additional tools are used for infusion of resin. Current manufacturing processes include transfer of formed parts from forming tools to separate curing or infusion tools. Transferring materials between multiple tools increases manufacturing time.

Therefore, it would be desirable to have a method and apparatus that takes into account at least some of the issues discussed above, as well as other possible issues.

SUMMARY

An embodiment of the present disclosure provides a forming and curing tool for a blade stringer. The forming and curing tool comprises a first die with a first forming surface comprising a first blade face and a first flange face; a second die with a second forming surface comprising a second blade face and a second flange face; a tool lid configured to seal against the first die and the second die to create a curing chamber; and a press configured to hold and move the first die, the second die, and the tool lid relative to each other.

Another embodiment of the present disclosure provides a forming and curing tool for a blade stringer. The forming and curing tool comprises a first die with a number of vacuum paths through the first die and a first forming surface comprising a first blade face and a first flange face; a second die with a number of vacuum paths and a second forming surface comprising a second blade face and a second flange face; a first clamp block configured to clamp a first cut and kitted material between the first clamp block and the first flange face; and second clamp block configured to clamp a second cut and kitted material between the second clamp block and the second flange face.

Another embodiment of the present disclosure provides a forming and curing tool for a blade stringer. Forming and curing tool comprises a first die with a heating system and a first forming surface comprising a first blade face and a first flange face; a second die with a heating system and a second forming surface comprising a second blade face and a second flange face; and a tool lid configured to seal against the first die and the second die to create a curing chamber.

Yet another embodiment of the present disclosure provides a method of forming a blade stringer. A first cut and kitted material is held against a first flange face of a first die. A second cut and kitted material is held against a second flange face of a second die. The method simultaneously forms the first cut and kitted material against a first blade face of the first die and the second cut and kitted material against a second blade face of the second die. The first cut and kitted material and the second cut and kitted material is clamped between the first die and the second die after forming the first cut and kitted material and the second cut and kitted material. A composite stringer preform comprising the first cut and kitted material, the second cut and kitted material, a noodle, and a base material is cured while the composite stringer preform is against the first flange face and the second flange face.

A yet further embodiment of the present disclosure provides a method of forming a blade stringer. A first cut and kitted material is held against a first die. A second cut and kitted material is held against a second die. A forming device is moved between the first die and the second die to simultaneously form the first cut and kitted material against the first die and the second cut and kitted material against the second die. At least one of the first die or the second die is moved towards the other of the first die or the second die to bring the first cut and kitted material and second cut and kitted material into contact with each other. A noodle and a base material are applied over the first cut and kitted material and second cut and kitted material while the first cut and kitted material and the second cut and kitted material are in contact with each other. A composite stringer preform comprising the first cut and kitted material, the second cut and kitted material, the noodle, and the base material is cured while the composite stringer preform is against the first die and the second die.

A further embodiment of the present disclosure provides a method of forming a blade stringer. Blade portions of a blade stringer are simultaneously formed on a first die and a second die while restraining flange portions of the blade stringer on the first die and the second die. The blade portions are clamped between the first die and second die after forming. A composite stringer preform comprising the blade portions and the flange portions is cured while the blade portions and the flange portions are in contact with the first die and the second die.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 18A-18B are a flowchart of a method of forming a blade stringer in accordance with an illustrative embodiment;

FIGS. 19A-19B are a flowchart of a method of forming a blade stringer in accordance with an illustrative embodiment;

DETAILED DESCRIPTION

Figure 1:
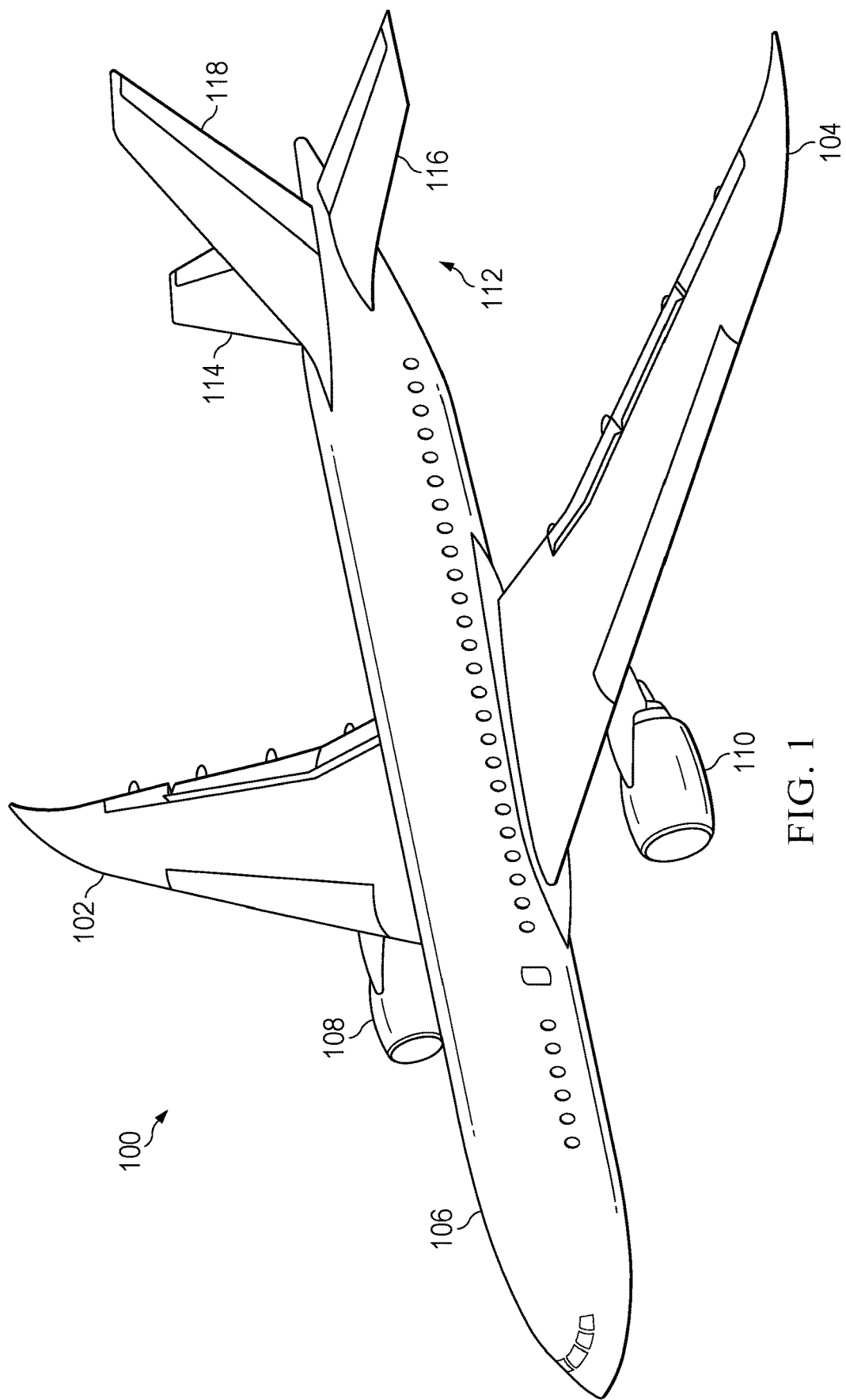
FIG. 1 is an illustration of an aircraft in accordance with an illustrative embodiment.

The illustrative examples recognize and take into account one or more different considerations. For example, the illustrative examples recognize and take into account that composite materials are strong, light-weight materials created by combining two or more functional components. For example, a composite material may include reinforcing fibers bound in polymer resin matrix. The fibers can take the form of a unidirectional tape, woven cloth or fabric, or a braid.

In manufacturing composite structures, layers of composite material are typically laid up on a tool. The layers may be comprised of fibers in sheets. In some cases, resin may be infused or pre-impregnated into the sheets. These types of sheets are commonly referred to as prepreg.

The illustrative examples recognize and take into account that transferring formed material to curing tools can potentially induce wrinkles or other inconsistencies in the formed material. The illustrative examples recognize and take into account that an increased tool count can have a higher upfront investment cost. The illustrative examples recognize and take into account that an increased tool count uses a greater amount of storage space.

The illustrative examples recognize and take into account that separate forming tools and curing tools can increases risk of tolerance stack-up during transfer process. The illustrative examples recognize and take into account that transfer of components between tools increases WIP time. The illustrative examples recognize and take into account that both forming tools and curing tools utilize controlled application of heat and pressure.

The illustrative examples recognize and take into account that composite blade stringer forming and curing or infusion uses specialized tooling and processing. The illustrative examples recognize and take into account that blade stringers are long, narrow stiffeners which make up part of a larger stiffened skin structure.

The illustrative examples recognize and take into account that for high-rate aircraft production, the capital cost of tooling and equipment, along with floor space for the number of work cells to make rate, adds up to a considerable cost for a new aircraft program. The illustrative examples recognize and take into account that existing forming methods are aimed at lower rate applications. The illustrative examples recognize and take into account that existing forming methods rely on either hand forming of the stringers, or stringers being more symmetric, which then utilizes trimming to meet part dimensions and additional lost time and wasted material. The illustrative examples recognize and take into account that existing curing solutions are complicated co-cure tools, which are labor intensive in assembly. The illustrative examples recognize and take into account that programs which currently use these tools are low-rate, and not effected by the floor space and tool counts which would be required for higher rate aircraft programs.

The illustrative examples provide blade stringer forming methods and tooling. The illustrative examples form and then cure blade stringers utilizing a forming and curing tool. The forming and curing tool includes a number of dies used for both forming and curing.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components that can be manufactured using the methods and tooling of the illustrative examples. For example, blade stringers within aircraft 100 can be formed using the forming and curing tool of the illustrative examples.

Figure 2:
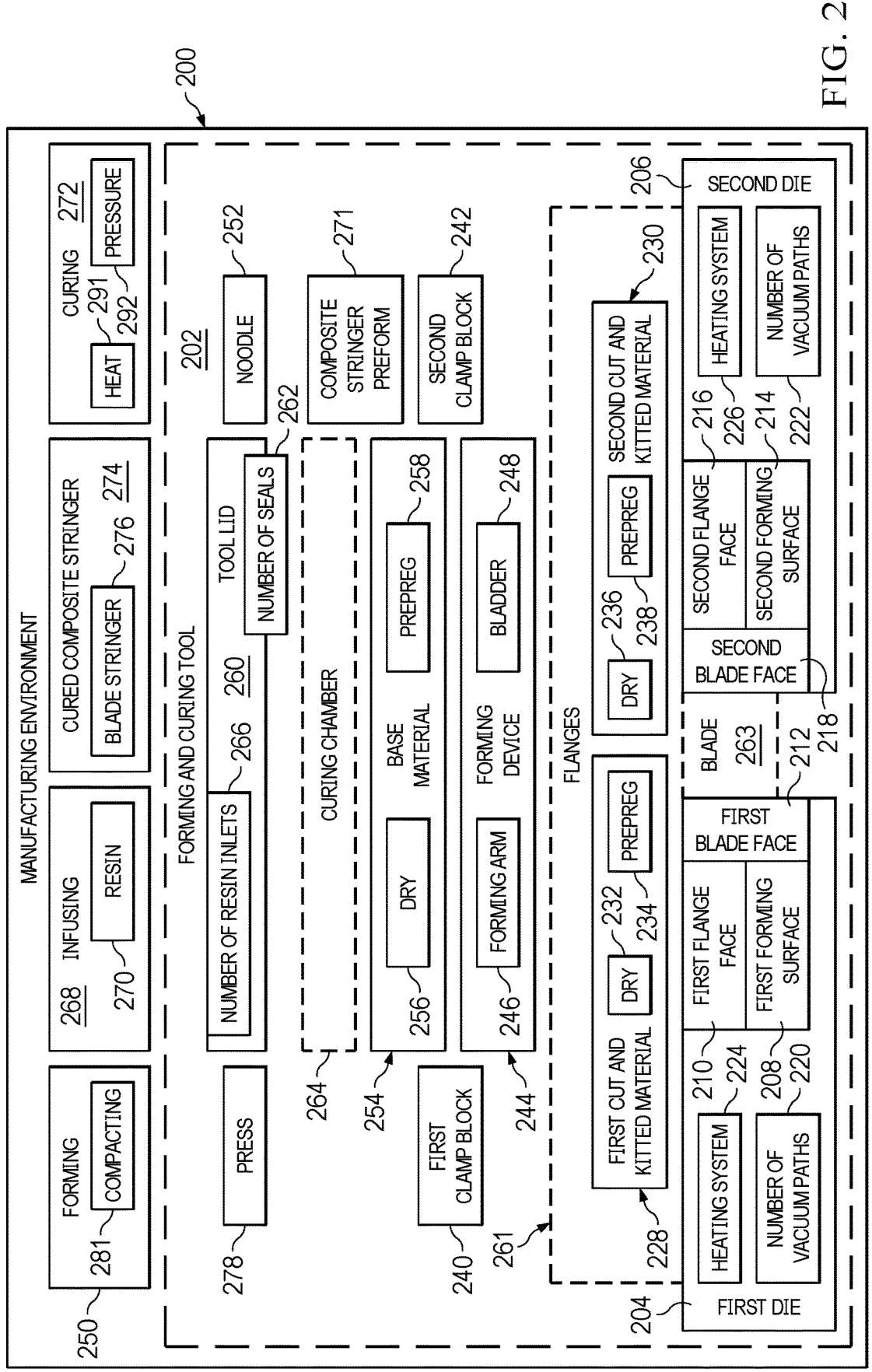
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 can be produced in manufacturing environment 200. Forming and curing tool 202 in manufacturing environment 200 is configured to perform both forming and curing of composite materials to form cured composite stringer 274.

Forming and curing tool 202 for blade stringer 276 comprises first die 204, second die 206, tool lid 260, and press 278. First die 204 has first forming surface 208 comprising first blade face 212 and first flange face 210. Second die 206 has second forming surface 214 comprises second blade face 218 and second flange face 216. Tool lid 260 is configured to seal against first die 204 and second die 206 to create curing chamber 264. Press 278 is configured to hold and move first die 204, second die 206, and tool lid 260 relative to each other.

Forming and curing tool 202 is configured to perform forming 250, curing 272, and optionally infusing 268 of material to form cured composite stringer 274. In this illustrative example, forming and curing tool 202 is configured to form blade stringer 276 by forming 250 and curing 272 first cut and kitted material 228, second cut and kitted material 230, noodle 252, and base material 254.

First cut and kitted material 228 and second cut and kitted material 230 are formed over first die 204 and second die 206 to create blade 263 of blade stringer 276. Blade 263 portions of blade stringer 276 are simultaneously formed on first die 204 and second die 206 while restraining flange portions of blade stringer 276 on first die 204 and second die 206. Forming and curing tool 202 further comprises first clamp block 240 configured to clamp first cut and kitted material 228 between first clamp block 240 and first flange face 210, and second clamp block 242 configured to clamp second cut and kitted material 230 between second clamp block 242 and second flange face 216.

First cut and kitted material 228 can take any desirable form. In some illustrative examples, first cut and kitted material 228 is dry 232. In some illustrative examples, first cut and kitted material 228 is formed of prepreg 234. Second cut and kitted material 230 can take any desirable form. In some illustrative examples, second cut and kitted material 230 is dry 236. In some illustrative examples, second cut and kitted material 230 is formed of prepreg 238.

Flanges 261 of blade stringer 276 are formed by placing first cut and kitted material 228 in contact with first flange face 210 and placing second cut and kitted material 230 in contact with second flange face 216.

First clamp block 240 restrains first cut and kitted material 228 between first clamp block 240 and first flange face 210. Second clamp block 242 restrains second cut and kitted material 230 between second clamp block 242 and second flange face 216. With first cut and kitted material 228 restrained against first flange face 210 of first die 204 and second cut and kitted material 230 restrained against second flange face 216 of second die 206, first cut and kitted material 228 is formed against first blade face 212 and second cut and kitted material 230 is formed against second blade face 218.

Forming device 244 is configured to move between the first die and the second die and configured to form a first cut and kitted material against the first blade face and a second cut and kitted material against the second blade face simultaneously. Forming 250 first cut and kitted material 228 onto first blade face 212 and forming 250 second cut and kitted material 230 onto second blade face 218 comprises lowering forming device 244 between first die 204 and second die 206. Forming 250 first cut and kitted material 228 onto first blade face 212 and forming 250 second cut and kitted material 230 onto second blade face 218 comprises lowering forming device 244 to apply pressure to first cut and kitted material 228 and second cut and kitted material 230.

Forming device 244 is formed of a material configured to contact first cut and kitted material 228 and second cut and kitted material 230 without undesirably affecting first cut and kitted material 228 and second cut and kitted material 230. In some illustrative examples, forming device 244 is solid. For example, forming device 244 can take the form of forming arm 246. In some illustrative examples, forming device 244 is inflatable. When forming device 244 is inflatable, geometry of forming device 244 can change during use of forming device 244. For example, forming device 244 can take the form of bladder 248. In some illustrative examples, forming device 244 comprises one of bladder 248 or forming arm 246. In some illustrative examples, vacuum bag-based forming methods can be used instead of forming arm 246 or bladder 248.

After forming 250 first cut and kitted material 228 and second cut and kitted material 230 using forming device 244, forming device is removed from between first die 204 and second die 206. After removing forming device 244, at least one of first die 204 or second die 206 is moved towards the other of first die 204 or second die 206. By moving at least one of first die 204 or second die 206 towards the other, a portion of first cut and kitted material 228 and a portion of second cut and kitted material 230 are clamped between first die 204 and second die 206. By moving at least one of first die 204 or second die 206 towards the other, first cut and kitted material 228 and second cut and kitted material 230 are placed in contact with each other. First cut and kitted material 228 and second cut and kitted material 230 are clamped between first die 204 and second die 206.

Clamping comprises applying controlled pressure for forming blade 263 of blade stringer 276. Blade 263 comprises a portion of first cut and kitted material 228 and a portion of second cut and kitted material 230.

After removing forming device 244 and clamping first cut and kitted material 228 and second cut and kitted material 230, noodle 252 and base material 254 are placed over first cut and kitted material 228 and second cut and kitted material 230. Base material 254 can take the form of one of dry 256 material or prepreg 258. When base material 254 is dry 256, resin 270 will be infused into base material 254 prior to curing 272.

Base material 254, noodle 252, first cut and kitted material 228, and second cut and kitted material 230 form composite stringer preform 271. After placing base material 254 and noodle 252, tool lid 260 is lowered into contact with first die 204 and second die 206. Tool lid 260 is sealed to first die 204 and second die 206 to form curing chamber 264. As depicted, number of seals 262 associated with tool lid 260 can be used to seal tool lid 260 to first die 204 and second die 206. Although number of seals 262 is depicted as associated with tool lid 260, in some non-depicted illustrative examples, a number of seals can instead be associated with at least one of first die 204 or second die 206.

Prior to curing 272 composite stringer preform 271, forming 250 is performed on base material 254. Compacting 281 of base material 254 and noodle 252 is performed with base material 254 and noodle 252 in contact with first cut and kitted material 228 and second cut and kitted material 230. Tool lid 260 is pressed against base material 254 during forming 250 of base material 254.

During forming 250 of base material 254, composite stringer preform 271 is compacted. Heat and pressure are applied to composite stringer preform 271 to compact composite stringer preform 271. During compaction, air and moisture is removed from composite stringer preform 271. A vacuum is applied to curing chamber 264 to remove air and moisture from composite stringer preform 271.

In some illustrative examples, infusing 268 of resin 270 is performed prior to curing 272. In some illustrative examples, resin 270 is infused into composite stringer preform 271 prior to curing 272. Infusing 268 resin 270 into first cut and kitted material 228, second cut and kitted material 230, noodle 252, and base material 254 to form composite stringer preform 271 is performed while first cut and kitted material 228 is in contact with first forming surface 208 and second cut and kitted material 230 is in contact with second forming surface 214.

In some illustrative examples, resin 270 is infused into first cut and kitted material 228, second cut and kitted material 230, and base material 254 by pressing tool lid 260 downward. In these illustrative examples, resin 270 is introduced to a gap between tool lid 260 and base material 254 in curing chamber 264. After introducing resin 270 to curing chamber 264, resin 270 is forced into the dry materials using tool lid 260. Resin 270 can be introduced to curing chamber 264 through at least one of tool lid 260, first die 204, or second die 206. In some illustrative examples, tool lid 260 comprises number of resin inlets 266.

In some illustrative examples, infusing 268 is optional. In some illustrative examples, first cut and kitted material 228 is prepreg 234, second cut and kitted material 230 is prepreg 238, and base material 254 is prepreg 258. In these illustrative examples, forming 250 base material 254 in curing chamber 264 forms composite stringer preform 271.

Composite stringer preform 271 is cured to form blade stringer 276. Curing 272 includes application of heat 291 and pressure 292. Pressure 292 is controlled to provide desired pressure 292 for curing.

To apply vacuum during one of forming 250, infusing 268, or curing 272, vacuum paths can be present through or between at least one of tool lid 260, first die 204 or second die 206. In some illustrative examples, first die 204 has number of vacuum paths 220 through first die 204 and first forming surface 208 comprising first blade face 212 and first flange face 210; second die 206 has number of vacuum paths 222 and second forming surface 214 comprising a second blade face 218 and a second flange face 216; first clamp block 240 configured to clamp first cut and kitted material 228 between the first clamp block 240 and the first flange face 210; and second clamp block 242 configured to clamp a second cut and kitted material 230 between the second clamp block 242 and the second flange face 216.

In some illustrative examples, press 278 is configured to move the forming device 244 relative to first die 204 and second die 206. In some illustrative examples, press 278 is further configured to hold and apply pressure to at least one of first die 204, the second die 206, the first clamp block 240, or the second clamp block 242. In some illustrative examples, press 278 is further configured to hold and apply pressure to tool lid 260 when present.

In some illustrative examples, forming and curing tool 202 for blade stringer 276 comprises first die 204 with heating system 224 and first forming surface 208 comprising first blade face 212 and first flange face 210; second die 206 with heating system 226 and second forming surface 214 comprising second blade face 218 and second flange face 216; and tool lid 260 configured to seal against first die 204 and second die 206 to create curing chamber 264. Infusing 268 of resin 270 and curing 272 is performed within curing chamber 264.

Tool components, including at least one of first die 204, second die 206, and tool lid 260, are capable of withstanding up to 200 PSI internal pressure while maintaining seal/vacuum integrity and internal surface profile tolerance within 0.010" of nominal. The location of number of resin inlets 266, number of vacuum paths 220, and number of vacuum paths 222 is based on design of blade stringer 276, type of resin 270, and other characteristics of infusing 268 resin 270.

Press 278 can be used to hold and move portions of forming and curing tool 202. For example, press 278 can hold and move first die 204 and second die 206 relative to each other. Press 278 can provide horizontal movement of at least one of first die 204 or second die 206 relative to each other to provide clamping and pressure for forming 250. Press 278 can provide vertical movement of forming device 244 relative to first die 204 and second die 206 to perform forming 250 of first cut and kitted material 228 and second cut and kitted material 230. Press 278 can provide vertical movement of forming device 244 to remove forming device 244 after forming 250. Press 278 can provide vertical movement of tool lid 260 to form curing chamber 264 and perform forming 250 of base material 254.

The provided process and forming and curing tool 202 moves smoothly and quickly from step to step. Automation decreases instances of technicians handling heated parts. Automation can include the use of pick and place systems for placing materials for composite stringer preform 271. Automation can include the movement of components of forming and curing tool 202 including at least one of first die 204, second die 206, forming device 244, and tool lid 260.

First die 204 and second die 206 are heated with any viable method. For isothermal or semi-isothermal processes, maintaining temperature of first die 204 and second die 206 will be more sustainable/lower heat usage than continually cooling and heating first die 204 and second die 206. By allowing first die 204 and second die 206 to remain hot, thermal ramps are reduced. Thermal ramps are reduced by not moving between separate forming tools and infusion and curing tools.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of resin inlets 266 is depicted in tool lid 260, in some illustrative examples a number of resin inlets is also present in at least one of first die 204 or second die 206.

Although not depicted in FIG. 2, locating and indexing features can be present. In some illustrative examples, there are indexing features present for the pick and place (PnP) equipment carrying the materials such as first cut and kitted material 228, second cut and kitted material 230, noodle 252, and base material 254. In some illustrative examples, indexing features are present between components of forming and curing tool 202 and press 278. In some illustrative examples, indexing features are present between the different components of forming and curing tool 202 such as first die 204 and second die 206.

In some illustrative examples, locating for the materials, first cut and kitted material 228 and second cut and kitted material 230, is present on the tools, first die 204 and second die 206. In some illustrative examples, locating is based on the shape of first die 204 and second die 206. In some illustrative examples, visual locating features are present on at least one of first die 204 and second die 206.

First cut and kitted material 228 and second cut and kitted material 230 can be loaded in a direction into tool with minimal margin outside of Manufacturing Edge of Part (MEOP). The manufacturing edge of part typically includes a margin that is trimmed in a later step prior to assembly. In some manufacturing processes indexing features are included into an edge of a part. In this illustrative example, locating features are not used because the cut and kitted materials can be manufactured to the size of the recess in the tool. For example, base material 254 can be manufactured to dimensions of the width and length of curing chamber 264.

Figure 3:
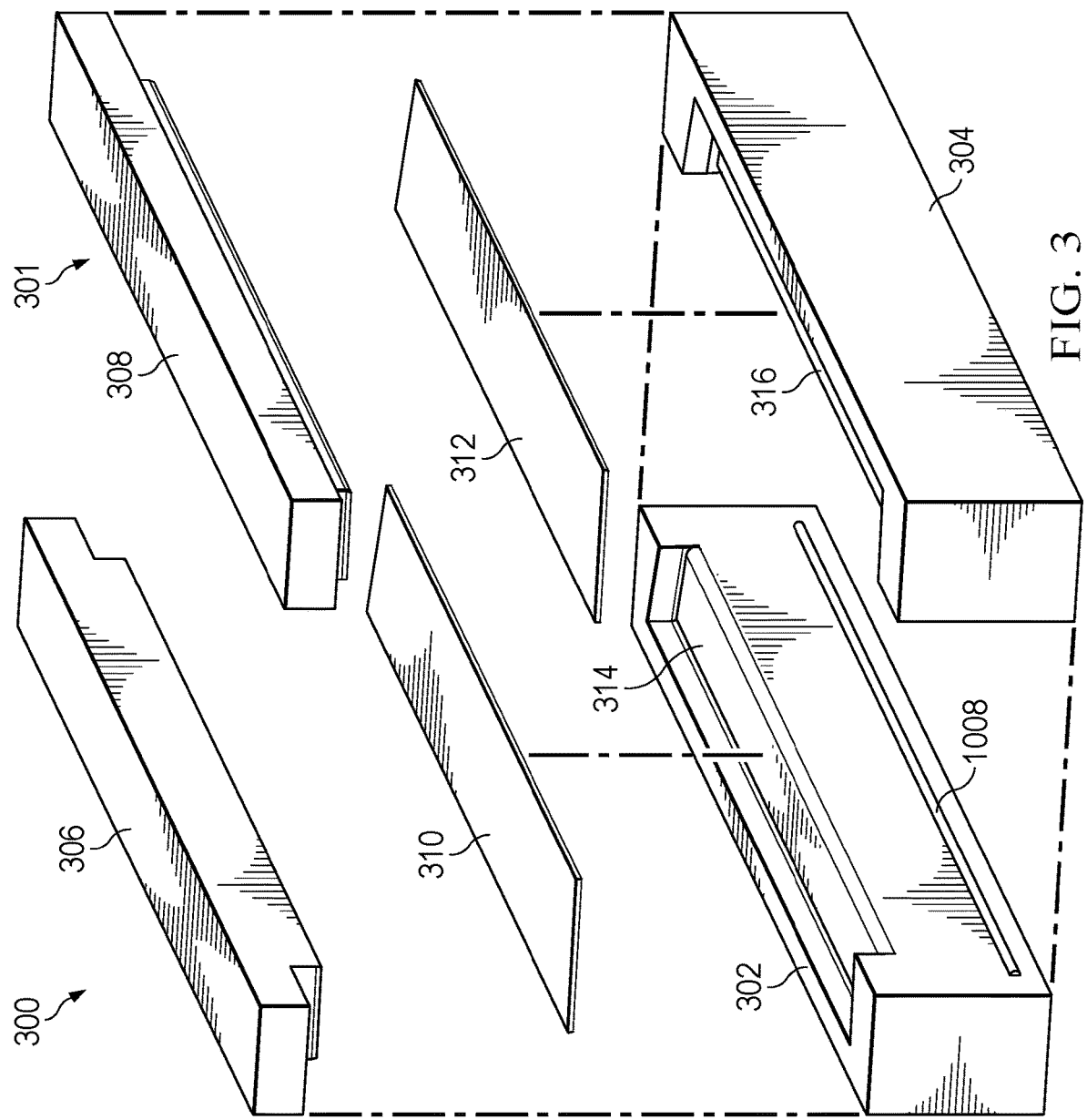
FIG. 3 is a perspective exploded view of portions of a forming and curing tool and cut and kitted materials in accordance with an illustrative embodiment.

Turning now to FIG. 3, a perspective exploded view of portions of a forming and curing tool and cut and kitted materials is depicted in accordance with an illustrative embodiment. Forming curing tool 301 in view 300 is a physical implementation of forming and curing tool 202 in FIG. 2.

Forming and curing tool 301 comprises first die 302, second die 304, first clamp block 306, and second clamp block 308. First clamp block 306 is configured to clamp first cut and kitted material 310 between first clamp block 306 and first forming surface 314. Second clamp block 308 is configured to clamp second cut and kitted material 312 between second clamp block 308 and second forming surface 316.

Figure 4:
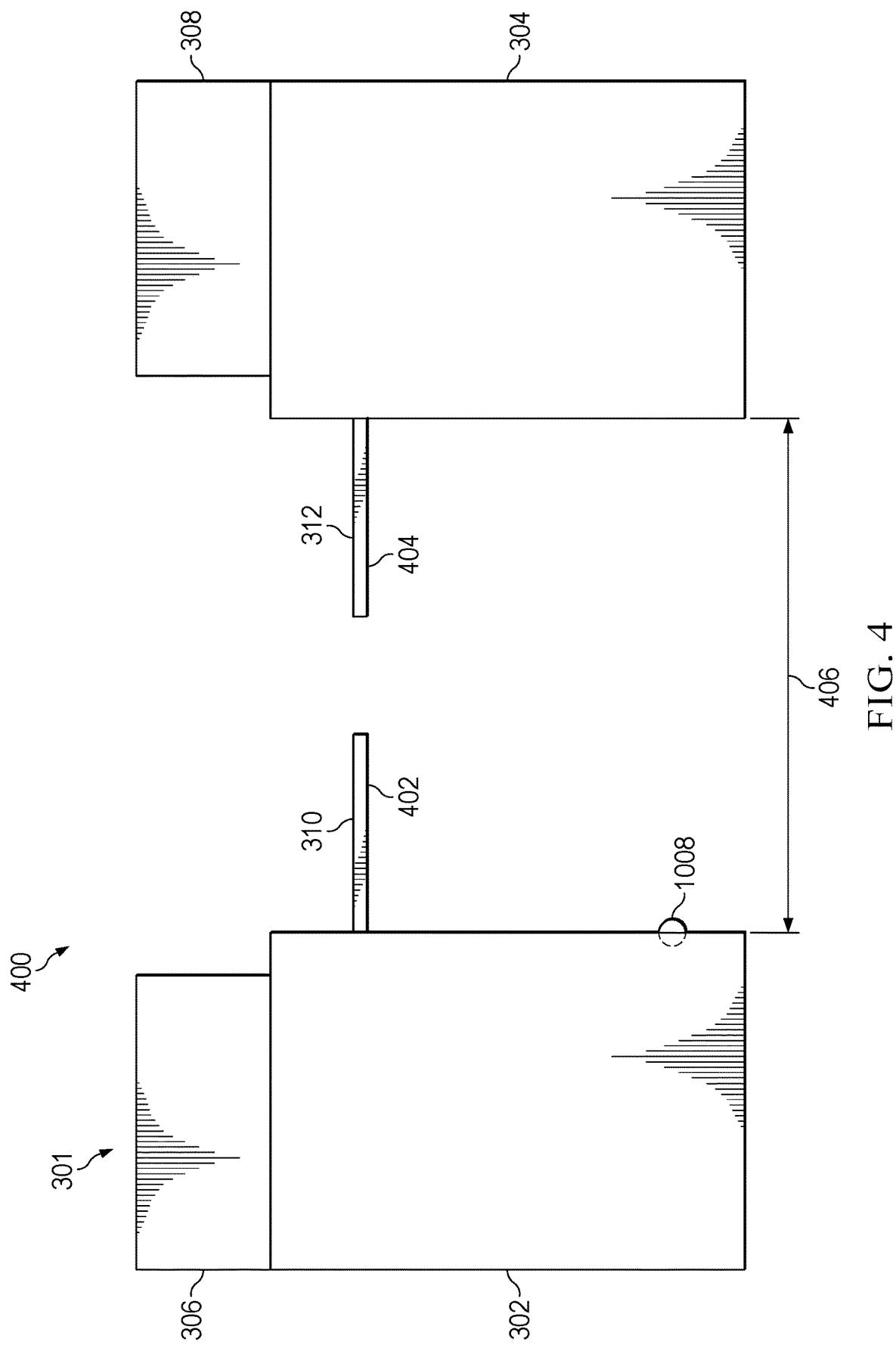
FIG. 4 is a side view of cut and kitted material clamped against dies of a forming and curing tool in accordance with an illustrative embodiment.

Turning now to FIG. 4, a side view of cut and kitted material clamped against dies of a forming and curing tool is depicted in accordance with an illustrative embodiment. View 400 is a side view of first cut and kitted material 310 clamped to first die 302 by first clamp block 306. As depicted, only a portion of first cut and kitted material 310 is clamped between first die 302 by first clamp block 306. Portion 402 of first cut and kitted material 310 extends out from first die 302.

In view 400, second cut and kitted material 312 is clamped to second die 304 by second clamp block 308. As depicted, only a portion of second cut and kitted material 312 is clamped between second die 304 and second clamp block 308. Portion 404 of second cut and kitted material 312 extends out from second die 304.

As depicted, portion 402 and portion 404 extend outwardly into gap 406 between first die 302 and second die 304.

Figure 5:
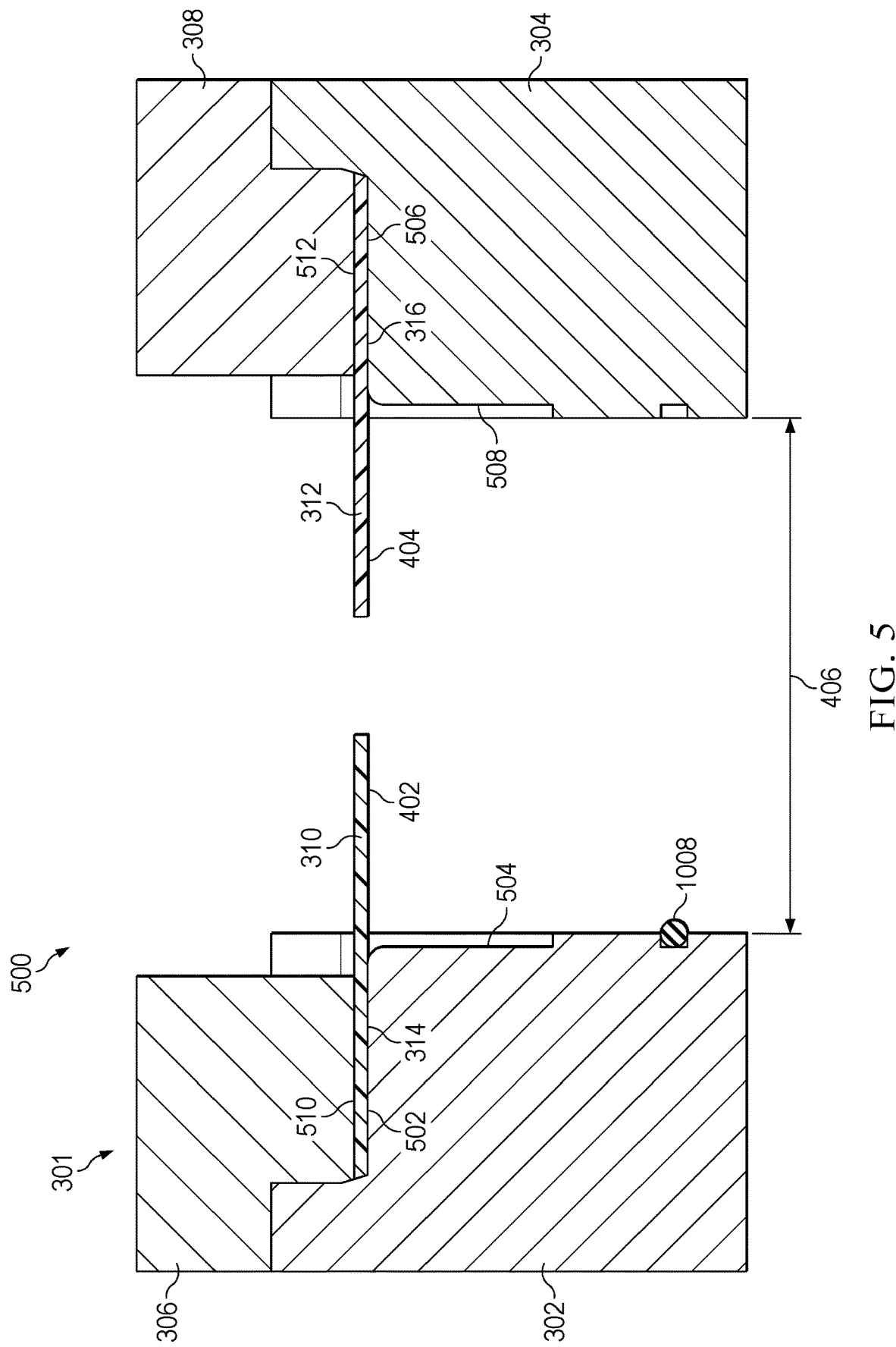
FIG. 5 is a cross-sectional view of cut and kitted material clamped against dies of a forming and curing tool in accordance with an illustrative embodiment.

Turning now to FIG. 5, a cross-sectional view of cut and kitted material clamped against dies of a forming and curing tool is depicted in accordance with an illustrative embodiment. View 500 is a cross-sectional view of first cut and kitted material 310 and second cut and kitted material 312 clamped to first die 302 and second die 304 respectively.

In view 500, first flange face 502 and first blade face 504 of first forming surface 314 are visible. In view 500, second flange face 506 and second blade face 508 of second forming surface 316 are visible. To form flanges of a blade stringer, portion 510 of first cut and kitted material 310 is clamped to first flange face 502 by first clamp block 306. Portion 510 of first cut and kitted material 310 is clamped with sufficient force to restrain portion 510 of first cut and kitted material 310 while first cut and kitted material 310 is formed.

To form flanges of a blade stringer, portion 512 of second cut and kitted material 312 is clamped to first flange face 502 by first clamp block 306. Portion 512 of second cut and kitted material 312 is clamped with sufficient force to restrain portion 512 of second cut and kitted material 312 while second cut and kitted material 312 is formed.

In some illustrative examples, first clamp block 306 and first die 302 clamp portion 510 of first cut and kitted material 310 sufficiently to form first cut and kitted material 310. In some illustrative examples, second clamp block 308 and second die 304 clamp portion 512 of second cut and kitted material 312 sufficiently to form second cut and kitted material 312.

Figure 6:
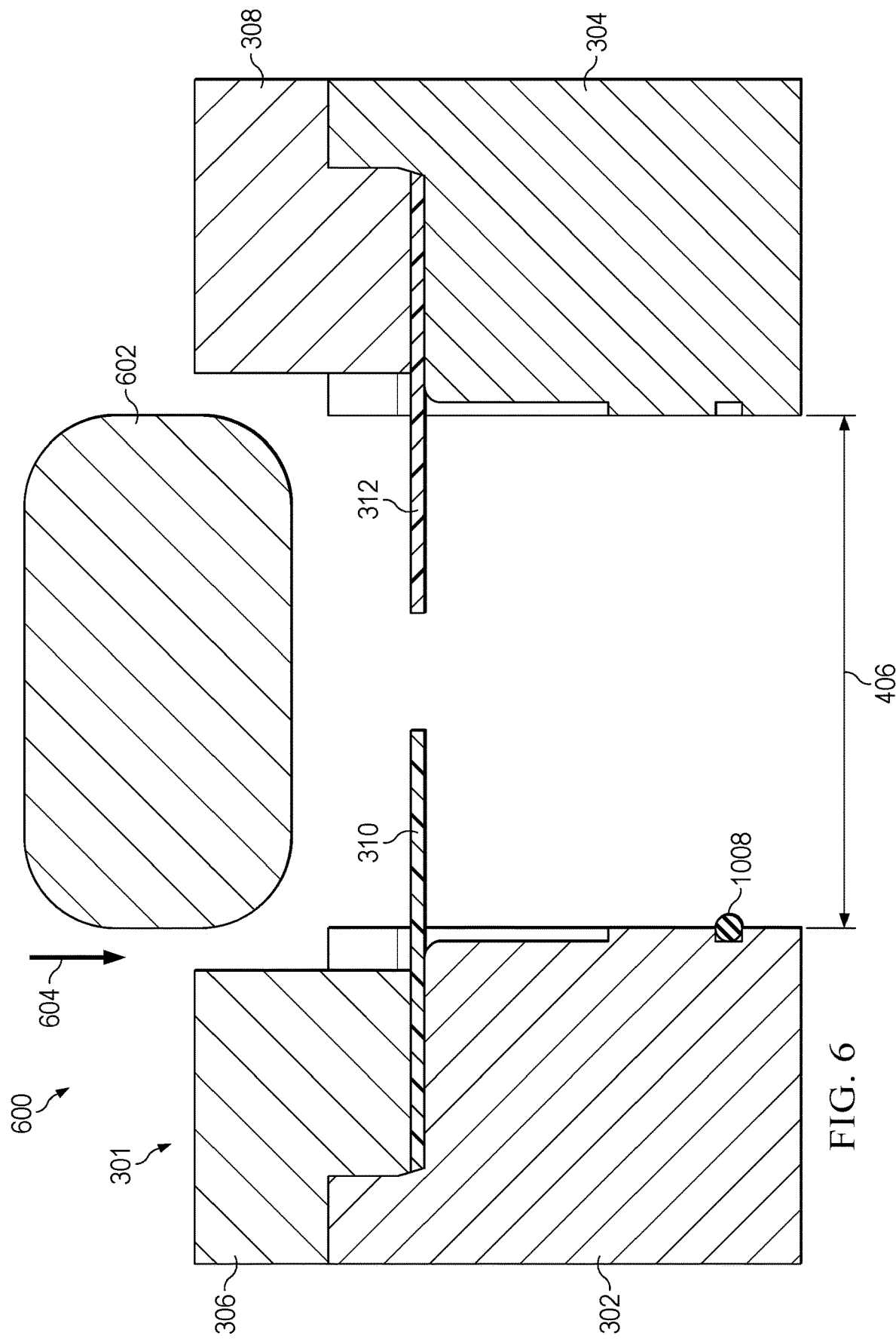
FIG. 6 is a cross-sectional view of a forming device positioned relative to cut and kitted material clamped against dies of a forming and curing tool in accordance with an illustrative embodiment.

Turning now to FIG. 6, a cross-sectional view of a forming device positioned relative to cut and kitted material clamped against dies of a forming and curing tool is depicted in accordance with an illustrative embodiment. In view 600 of forming and curing tool 301, forming device 602 has been positioned to form first cut and kitted material 310 and second cut and kitted material 312 as forming device 602 moves in direction 604 relative to first die 302 and second die 304. In view 600, forming device 602 is aligned with gap 406 such that forming device 602 can move through gap 406 in between first die 302 and second die 304 in direction 604.

Figure 7:
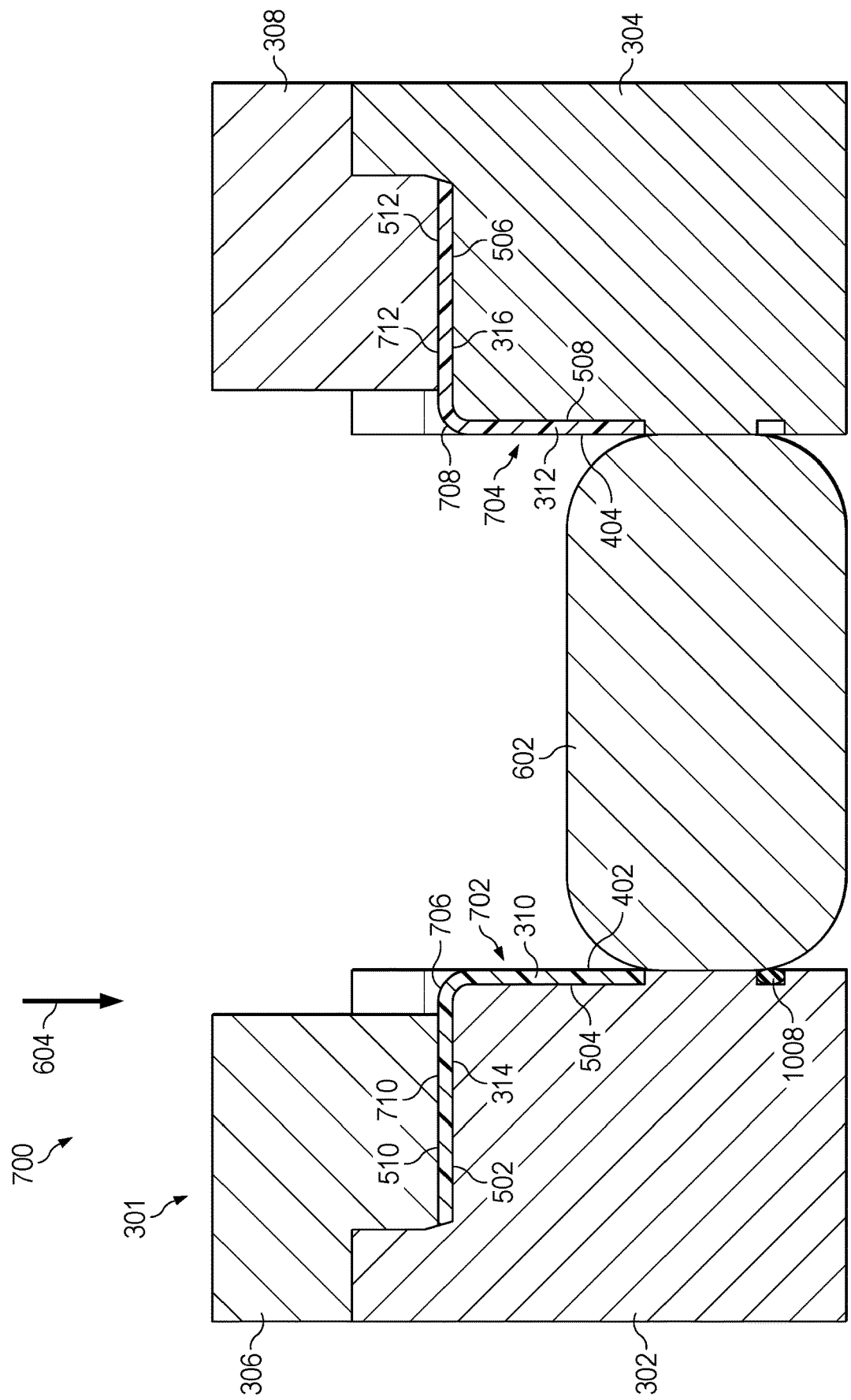
FIG. 7 is a cross-sectional view of cut and kitted material formed against dies of a forming and curing tool by a forming device in accordance with an illustrative embodiment.

Turning now to FIG. 7, a cross-sectional view of cut and kitted material formed against dies of a forming and curing tool by a forming device is depicted in accordance with an illustrative embodiment. In view 700, forming device 602 has moved in direction 604 to simultaneously form first cut and kitted material 310 against first forming surface 314 and second cut and kitted material 312 against second forming surface 316.

In view 700, forming device 602 has formed portion 402 of first cut and kitted material 310 into blade portion 702. To create blade portion 702, first cut and kitted material 310 was formed against first blade face 504. In view 700, forming device 602 has formed portion 404 of second cut and kitted material 312 into blade portion 704. To create blade portion 704, second cut and kitted material 312 was formed against second blade face 508.

By forming portion 402 of first cut and kitted material 310 against first blade face 504, radius 706 is formed in first cut and kitted material 310. By forming portion 404 of second cut and kitted material 312 against second blade face 508, radius 708 is formed in second cut and kitted material 312. Radius 706 connects blade portion 702 and flange portion 710 of first cut and kitted material 310. Radius 708 connects blade portion 704 and flange portion 712 of second cut and kitted material 312.

Blade portions, blade portion 702 and blade portion 704, of a blade stringer are simultaneously formed on first die 302 and second die 304 while restraining flange portions, flange portion 710 and flange portion 712, of the blade stringer on first die 204 and second die 206. After forming the blade portions, the blade portions are clamped between first die 302 and second die 304 in FIG. 8.

As depicted, forming device 612 applied pressure to first cut and kitted material 310 and second cut and kitted material 312 to form blade portions for a blade stringer. In some illustrative examples, heat is applied to first cut and kitted material 310 and second cut and kitted material 312 during forming. In some illustrative examples, at least one of first die 302, second die 304, first clamp block 306, and second clamp block 308 comprises a heating system. In some illustrative examples, at least one of first die 302, second die 304, first clamp block 306, and second clamp block 308 provides integral heating. In some illustrative examples, an integral heating system can comprise at least one of liquid, electric, inductive, or steam heating.

When first cut and kitted material 310 and second cut and kitted material 312 are heated, thermoplastic materials in first cut and kitted material 310 and second cut and kitted material 312 are softened. For example, a thermoplastic veil within at least one of first cut and kitted material 310 or second cut and kitted material 312 is softens during heating and will retain its formed shape once cooled. In other illustrative examples a thermoplastic powdered resin, or other thermoplastic can be present in first cut and kitted material 310 and second cut and kitted material 312.

Figure 8:
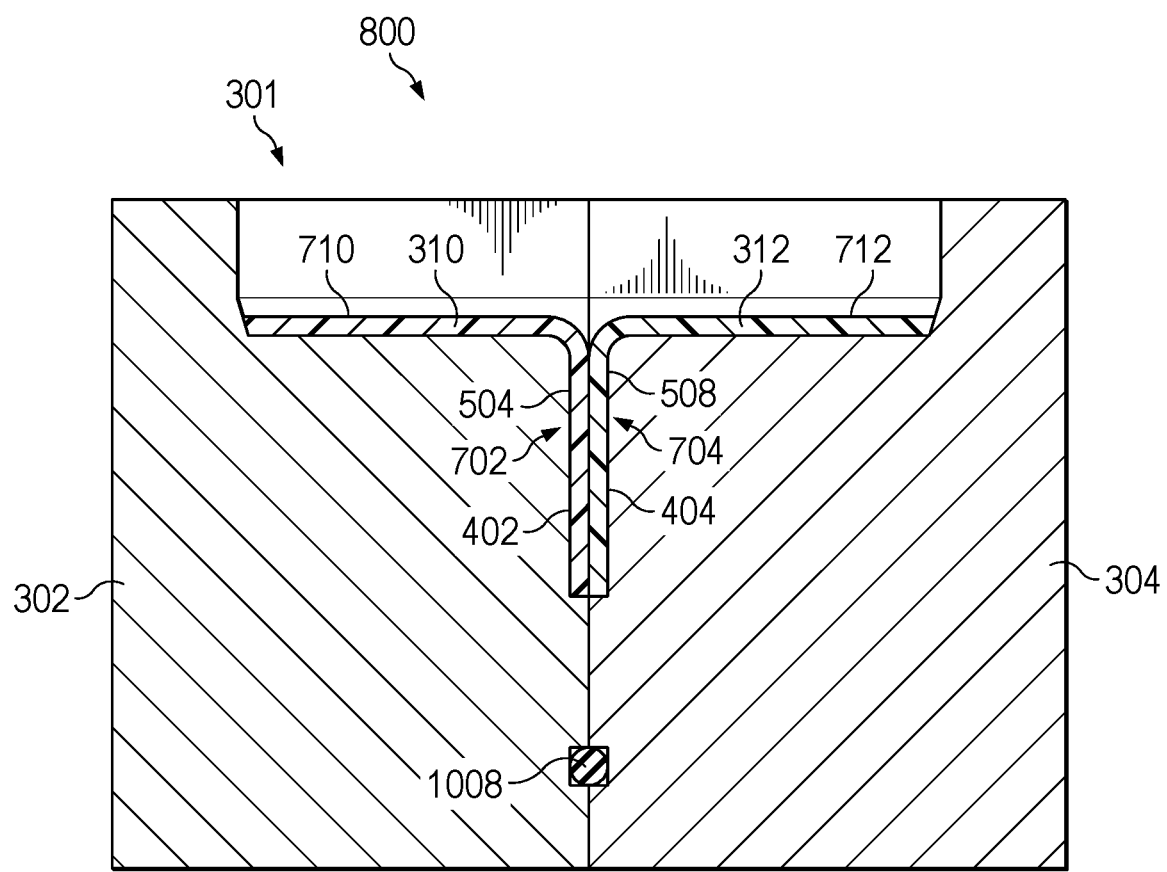
FIG. 8 is a cross-sectional view of cut and kitted material clamped between dies of a forming and curing tool in accordance with an illustrative embodiment.

Turning now to FIG. 8, a cross-sectional view of cut and kitted material clamped between dies of a forming and curing tool is depicted in accordance with an illustrative embodiment. In view 800, forming device 602 of FIGS. 6 and 7 has been removed. In view 800, at least one of first die 302 or second die 304 has been moved towards the other of first die 302 or second die 304. In view 800, portion 402 of first cut and kitted material 310 and portion 404 of second cut and kitted material 312 is clamped between first die 302 and second die 304.

Blade portion 702 remains in contact with first blade face 504. Blade portion 704 remains in contact with second blade face 508. Blade portion 702 and blade portion 704 are in contact with each other. Blade portion 702 and blade portion 704 will form a blade of a blade stringer.

In some illustrative examples, first die 302 and second die 304 apply sufficient pressure to first cut and kitted material 310 and second cut and kitted material 312 to compact portion 402 and portion 404.

Figure 9:
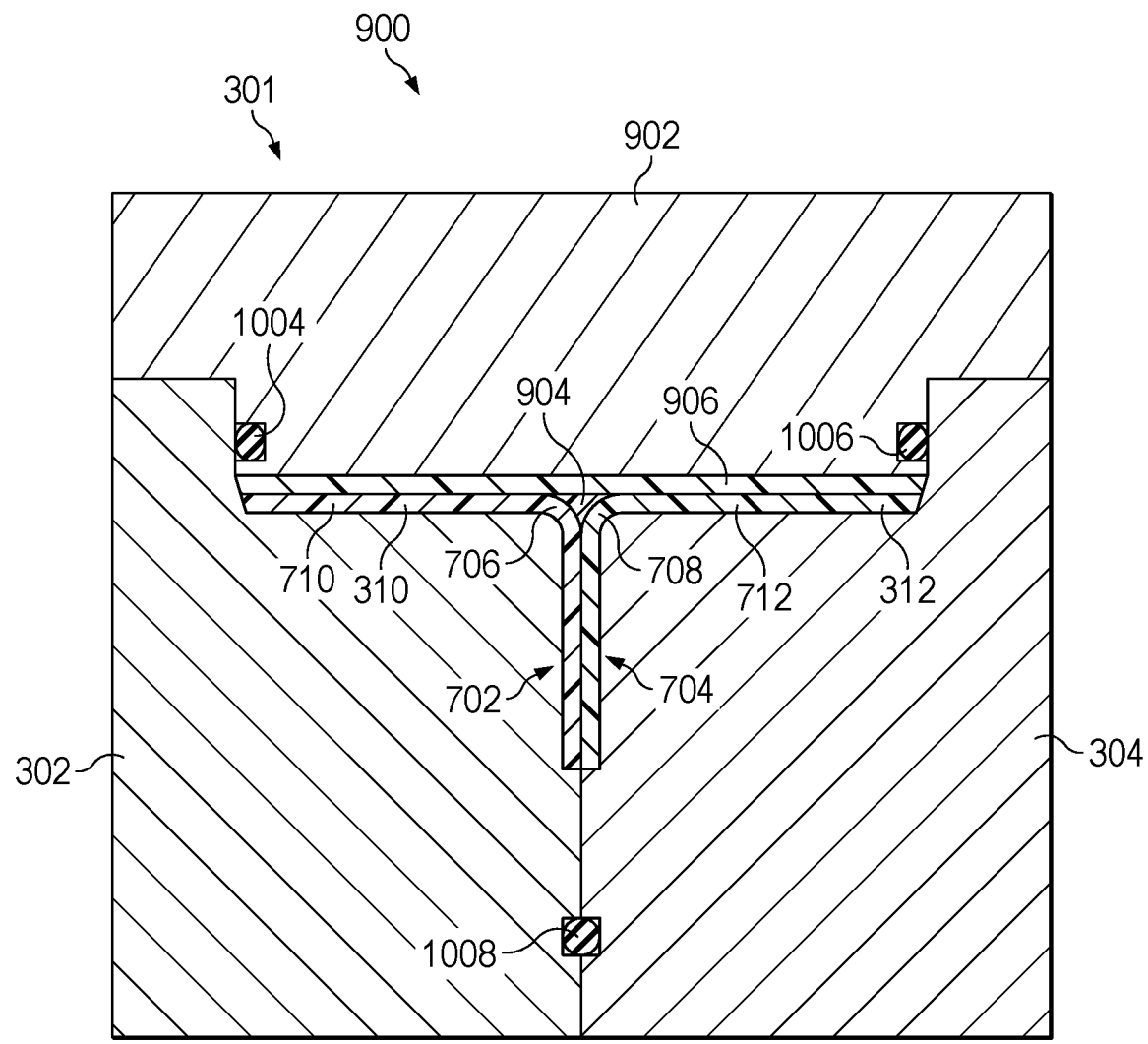
FIG. 9 is a cross-sectional view of a forming and curing tool with material within a forming chamber in accordance with an illustrative embodiment.

Turning now to FIG. 9, a cross-sectional view of a forming and curing tool with material within a forming chamber is depicted in accordance with an illustrative embodiment. In view 900, noodle 904 has been placed in contact with first cut and kitted material 310 and second cut and kitted material 312. Noodle 904 is placed in contact with radius 706 of first cut and kitted material 310 and radius 708 of second cut and kitted material 312. Base material 906 is placed over noodle 904, first cut and kitted material 310, and second cut and kitted material 312.

In view 900, tool lid 902 has been placed over noodle 904 and base material 906. Tool lid 902 presses base material 906 to form base material 906 and noodle 904. In some illustrative examples, heating is supplied by at least one of first die 302, second die 304, or tool lid 902. Heating and pressure are applied to base material 906, noodle 904, first cut and kitted material 310, and second cut and kitted material 312 to form a final blade stringer shape. In this illustrative example, pressure is applied by first die 302 and second die 304 in a horizontal direction. In this illustrative example, final closing pressure of tool lid 902 provides vertical pressure against base material 906, noodle 904, first cut and kitted material 310, and second cut and kitted material 312.

In some illustrative examples, vacuum is applied to compact base material 906, noodle 904, first cut and kitted material 310, and second cut and kitted material 312. In some illustrative examples, vacuum is applied to base material 906, noodle 904, first cut and kitted material 310, and second cut and kitted material 312 to degas base material 906, noodle 904, first cut and kitted material 310, and second cut and kitted material 312.

Vacuum can be applied through integral vacuum lines (not depicted) in at least one of first die 302, second die 304, or tool lid 902. In some illustrative examples, vacuum lines can be present at the intersections between first die 302, second die 304, or tool lid 902.

Figure 10:
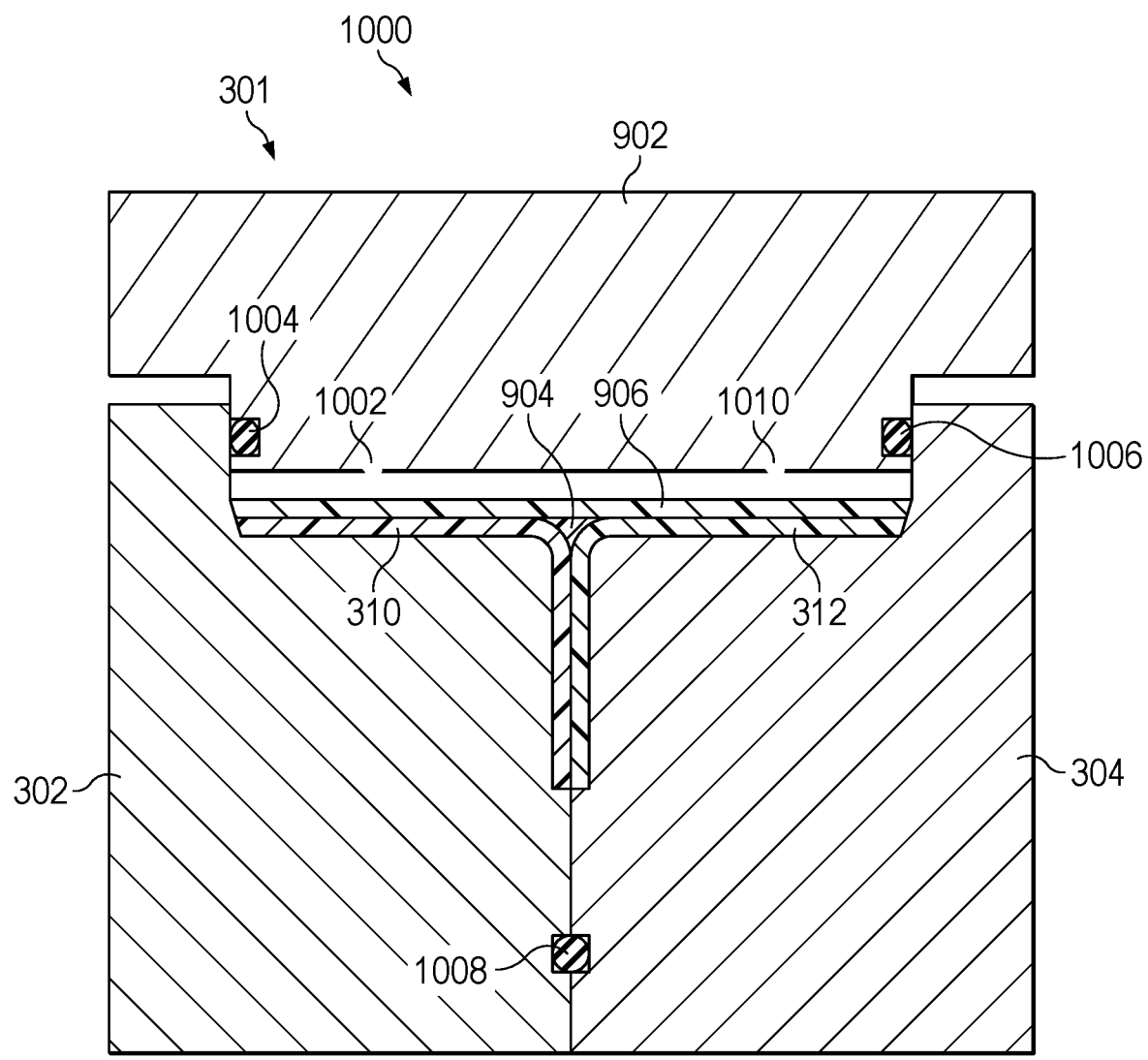
FIG. 10 is a cross-sectional view of a forming and curing tool after forming and prior to resin infusion in accordance with an illustrative embodiment.

Turning now to FIG. 10, a cross-sectional view of a forming and curing tool after forming and prior to resin infusion is depicted in accordance with an illustrative embodiment. In view 1000, tool lid 902 has been sealed against first die 302 and second die 304 to create curing chamber 1002. Between view 900 and view 1000, tool lid 902 has been pulled away from first die 302 and second die 304 to create gap 1010 in curing chamber 1002. Gap 1010 is a space between base material 906 and tool lid 902.

In some illustrative examples, vacuum is applied to base material 906, noodle 904, first cut and kitted material 310, and second cut and kitted material 312 to degas base material 906, noodle 904, first cut and kitted material 310, and second cut and kitted material 312.

Vacuum can be applied through integral vacuum lines (not depicted) in at least one of first die 302, second die 304, or tool lid 902. In some illustrative examples, vacuum lines can be present at the intersections between first die 302, second die 304, or tool lid 902.

In view 1000, tool lid 902 has been sealed against first die 302 and second die 304 by seal 1004 and seal 1006. First die 302 is sealed to second die 304 by seal 1008. Each of seal 1004, seal 1006, and seal 1008 is captive to a tool so the respective seal does not fall out when respective tools are separated. For example, seal 1008 is captive to one of first die 302 or second die 304 such that seal 1008 does not fall out when first die 302 and second die 304 are separated. As depicted, seal 1004 is captive to tool lid 902. As depicted, seal 1006 is captive to tool lid 902. In other non-depicted examples, at least one of seal 1004 or seal 1006 can be captive to first die 302 or second die 304.

The seals, seal 1004, seal 1006, and seal 1008, can be constrained in any desirable fashion. In some illustrative examples, constrained configurations for a seal can include, but are not limited to a seal cavity midline, a double circle seal, or a seal bonded in a groove. For a seal cavity midline inside of an edge of a tool, the seal cavity restrains the seal in a groove. For a double circle or other shape of seal with a narrow part of a seal, the narrow part of a seal can be retained in a groove. In some illustrative examples, a seal is bonded in a groove. A seal can be replaced and re-bonded periodically as part of preventative maintenance.

Figure 11:
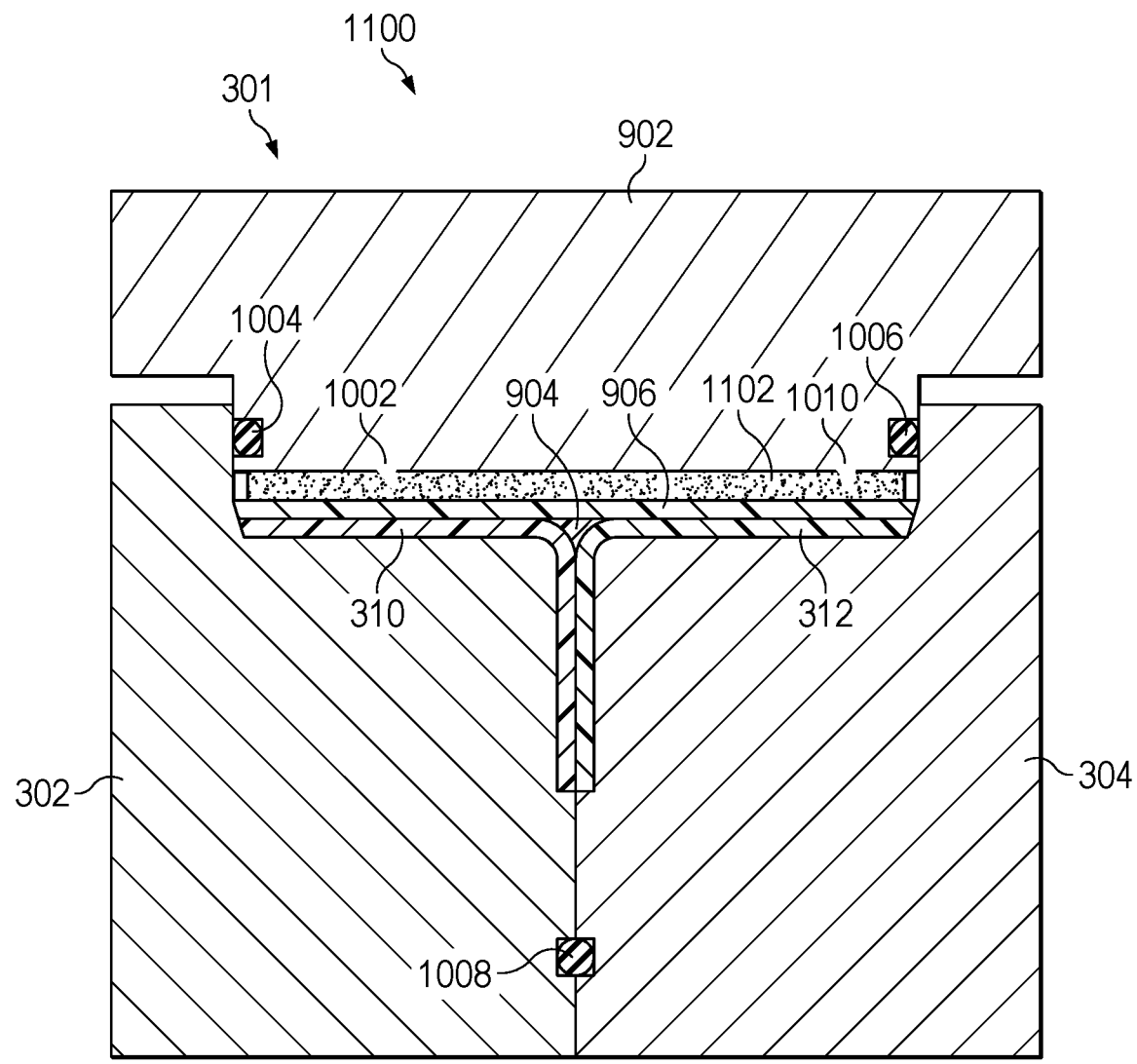
FIG. 11 is a cross-sectional view of a forming and curing tool performing resin infusion in accordance with an illustrative embodiment.

Turning now to FIG. 11, a cross-sectional view of a forming and curing tool performing resin infusion is depicted in accordance with an illustrative embodiment. In view 1100, resin 1102 has been introduced to gap 1010 in curing chamber 1002. In some illustrative examples, resin 1102 can be introduced through a number of resin inlets (not depicted) in tool lid 902. In some illustrative examples, resin 1102 can be introduced through a number of resin inlets (not depicted) in at least one of first die 302 or second die 304.

In this illustrative example, base material 906, first cut and kitted material 310, and second cut and kitted material 312 are formed of dry materials. Resin 1102 is introduced to curing chamber 1002 to be infused into base material 906, first cut and kitted material 310, and second cut and kitted material 312.

In some illustrative examples, base material 906, first cut and kitted material 310, and second cut and kitted material 312 are prepreg materials. In these non-depicted illustrative examples, resin infusion is not performed in curing chamber 1002. In these non-depicted illustrative examples, gap 1010 is not introduced into curing chamber 1002 after degassing the materials.

Figure 12:
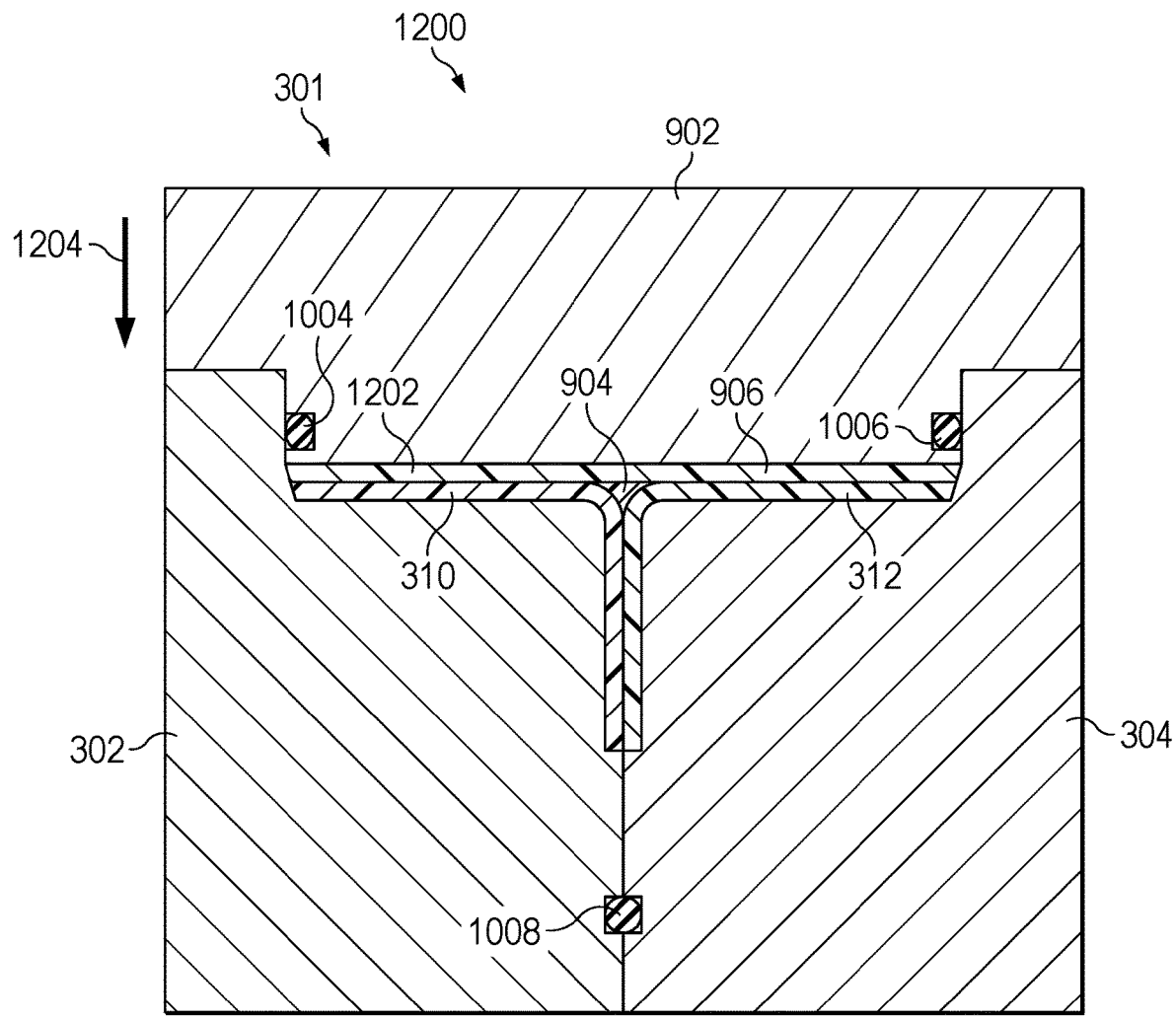
FIG. 12 is a cross-sectional view of a forming and curing tool performing resin infusion in accordance with an illustrative embodiment.

Turning now to FIG. 12, a cross-sectional view of a forming and curing tool performing resin infusion is depicted in accordance with an illustrative embodiment. In view 1200, tool lid 902 has been moved towards first die 302 and second die 304. In view 1200, gap 1010 is not present in curing chamber 1002. In view 1200, movement of tool lid 902 in direction 1204 has infused resin 1102 into base material 906, first cut and kitted material 310, and second cut and kitted material 312 to form composite stringer preform 1202.

In some illustrative examples, heat is applied during infusion of resin 1102. In some illustrative examples, integral heating in first die 302 and second die 304 is used to heat base material 906, noodle 904, first cut and kitted material 310, and second cut and kitted material 312 during infusion of resin 1102.

After infusing resin 1102, composite stringer preform 1202 is cured. Composite stringer preform 1202 is cured by applying controlled heat and pressure.

Heat and pressure are applied to cure composite stringer preform 1202 to create a blade stringer. In some illustrative examples, the heat is applied by integral heating of first die 302 and second die 304. The blade stringer formed by curing is the final cured part.

Figure 13:
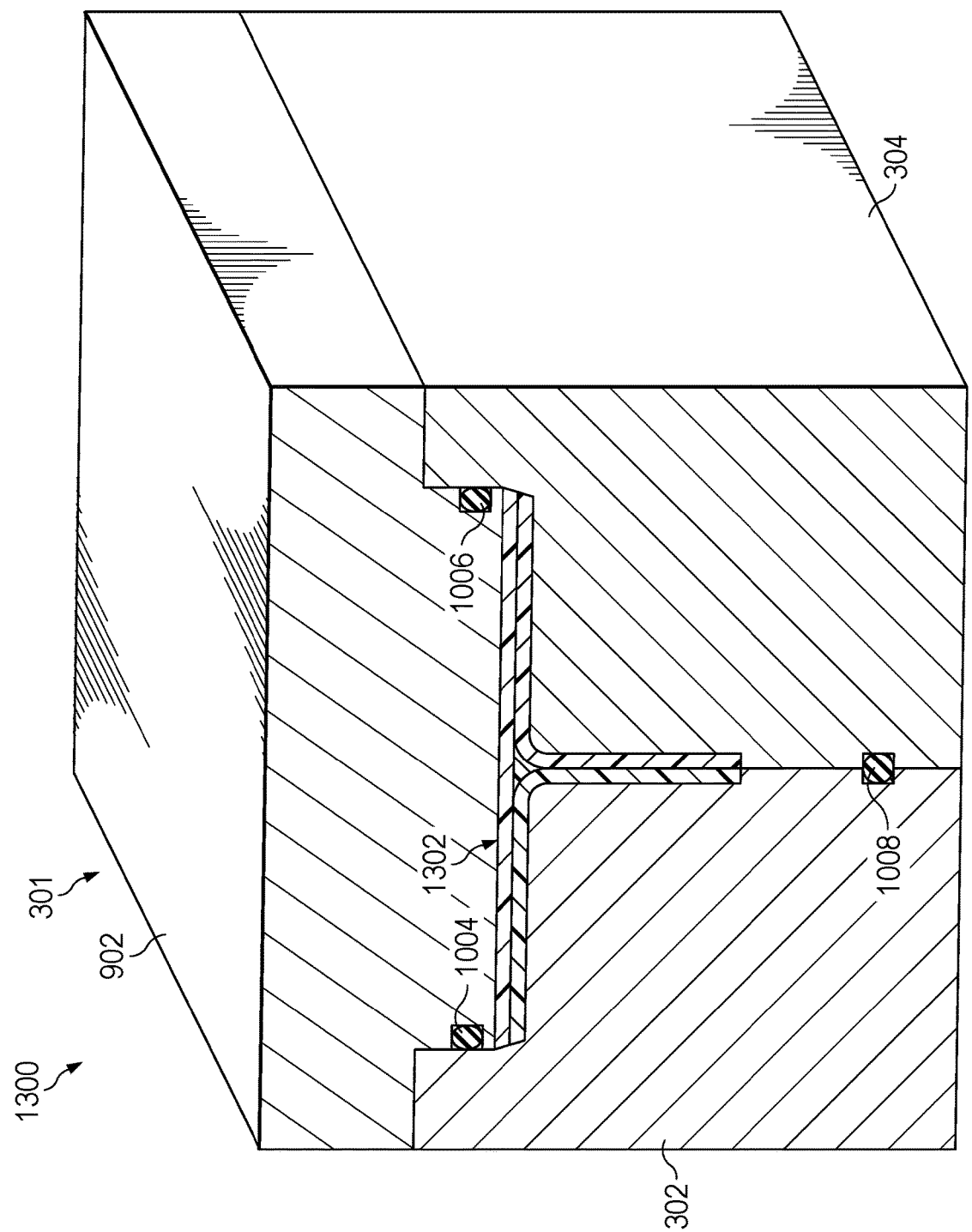
FIG. 13 is a cross-sectional view of a forming and curing tool during curing in accordance with an illustrative embodiment.

Turning now to FIG. 13, a cross-sectional view of a forming and curing tool during curing is depicted in accordance with an illustrative embodiment. In view 1300, tool lid 902 is in contact with blade stringer 1302. In view 1300, first die 302 and second die 304 are in contact with blade stringer 1302. During curing of composite stringer preform 1202 of FIG. 12, tool lid 902 is in contact with and applies pressure to composite stringer preform 1202. During curing of composite stringer preform 1202, first die 302 and second die 304 are in contact with and applies pressure to composite stringer preform 1202.

During curing, heat and pressure are applied to cure composite stringer preform 1202 to create blade stringer 1302. Although not depicted in FIG. 13 for simplicity of discussion, a number of vacuum lines can be present in at least one of first die 302, second die 304, or tool lid 902. The positioning, layout, and size of the number of vacuum lines are designed based on the shape of blade stringer 1302, the type of resin 1102, the temperature of resin infusing, and other operating properties of forming, compacting, resin infusing, and curing of the materials. The positioning, layout, and size of a number of resin inlets in at least one of first die 302, second die 304, or tool lid 902 are designed based on the shape of blade stringer 1302, the type of resin 1102, the temperature of resin infusing, and other operating properties of the resin infusing.

Figure 14:
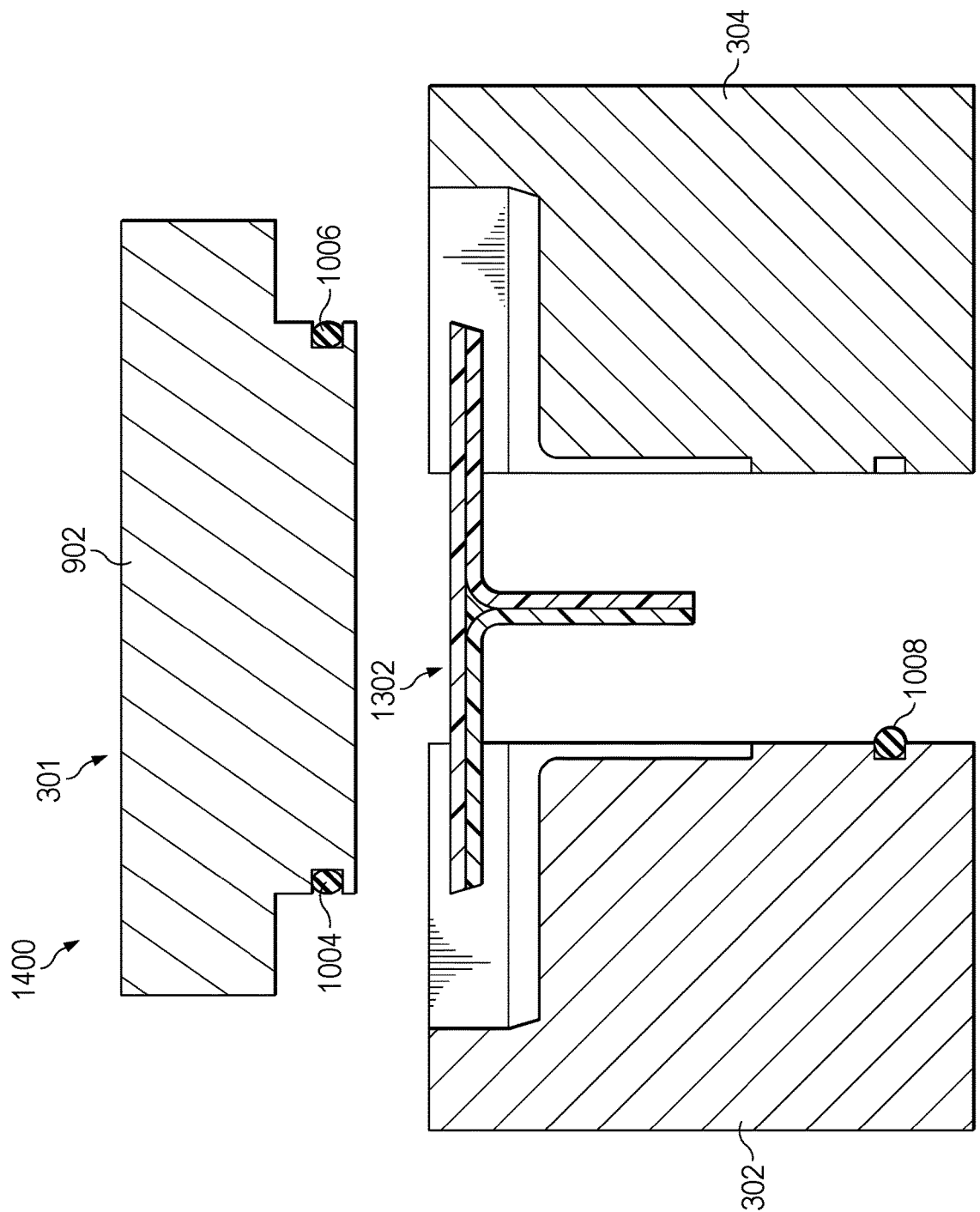
FIG. 14 is a cross-sectional view of a forming and curing tool and a resulting blade stringer in accordance with an illustrative embodiment.

Turning now to FIG. 14, a cross-sectional view of a forming and curing tool and a resulting blade stringer is depicted in accordance with an illustrative embodiment. Blade stringer 1400 can be a portion of aircraft 100 of FIG. 1. Blade stringer 1400 is a physical implementation of blade stringer 298 of FIG. 2. Blade stringer 1400 can be formed by forming and curing tool 202 of FIG. 2. Blade stringer 1400 can be formed and cured by forming and curing tool 301 of FIGS. 3-12. Blade stringer 1400 can be formed by forming device 1301 of FIG. 13.

Blade stringer 1400 is a cured composite component. Each of base 1402, noodle 1404, first L-shaped material 1406, and second L-shaped material 1408 are laid up, compacted, and cured together to form blade stringer 1400. Base 1402, first L-shaped material 1406, and second L-shaped material 1408 are formed of fiber sheets infused with resin.

Although blade stringer 1400 appears to be substantially straight, blade stringer 1400 can have a complex curvature. Surface of base 1402 has curvature perpendicular to length, and the length may pitch, roll, or yaw. The complex curvature for a specific blade stringer, such as blade stringer 1400, is based on a location within a platform, such as an aircraft. Different locations for blade stringers within a fuselage of an aircraft will have different complex curvatures.

In some illustrative examples, a cross-section of a blade stringer, such as blade stringer 1400, varies in gauge (thickness). To connect blade stringer 1400 to a skin, base 1402 will contact the skin. The skin may have ply drops to induce profile change.

The complex curvature, and possible non-symmetric flange/blade parts make conventional forming challenging and cure tooling complicated. The forming and curing tool of the illustrative examples make forming of blade stringer 1400 easier. The forming and curing tool of the illustrative examples make curing of blade stringer 1400 less complicated as the same tool is used for both forming and curing.

Figure 15:
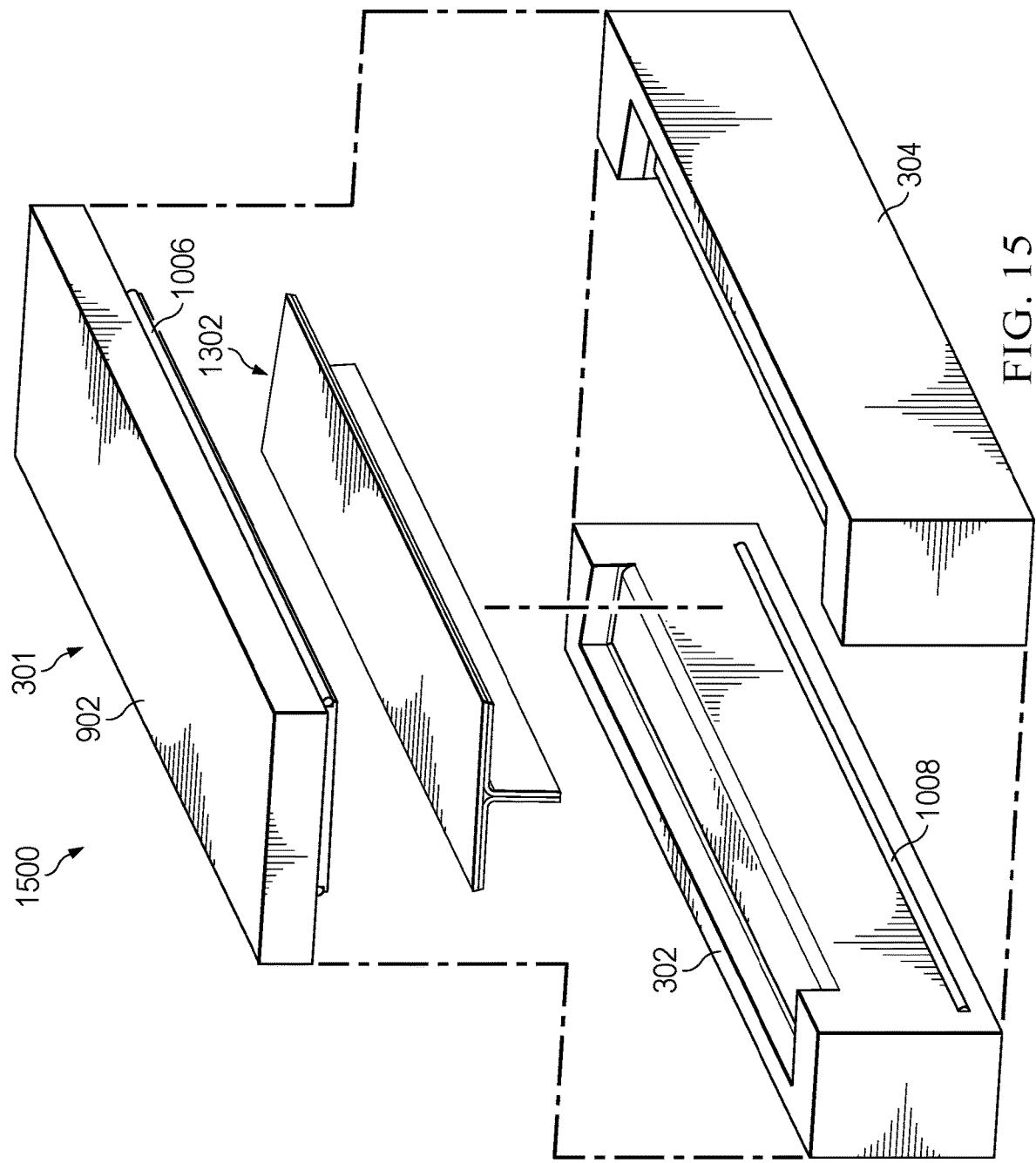
FIG. 15 is an exploded view of a forming and curing tool and a resulting blade stringer in accordance with an illustrative embodiment.

Turning now to FIG. 15, an exploded view of a forming and curing tool and a resulting blade stringer is depicted in accordance with an illustrative embodiment. View 1500 is an exploded view of forming and curing tool 301 with blade stringer 1302. To remove blade stringer 1302, tool lid 902 is removed from blade stringer 1302. To remove blade stringer 1302, at least one of first die 302 or second die 304 is moved away from the other of first die 302 and second die 304. In some illustrative examples, each of tool lid 902, first die 302, and second die 304 is moved by a common press.

Figure 16:
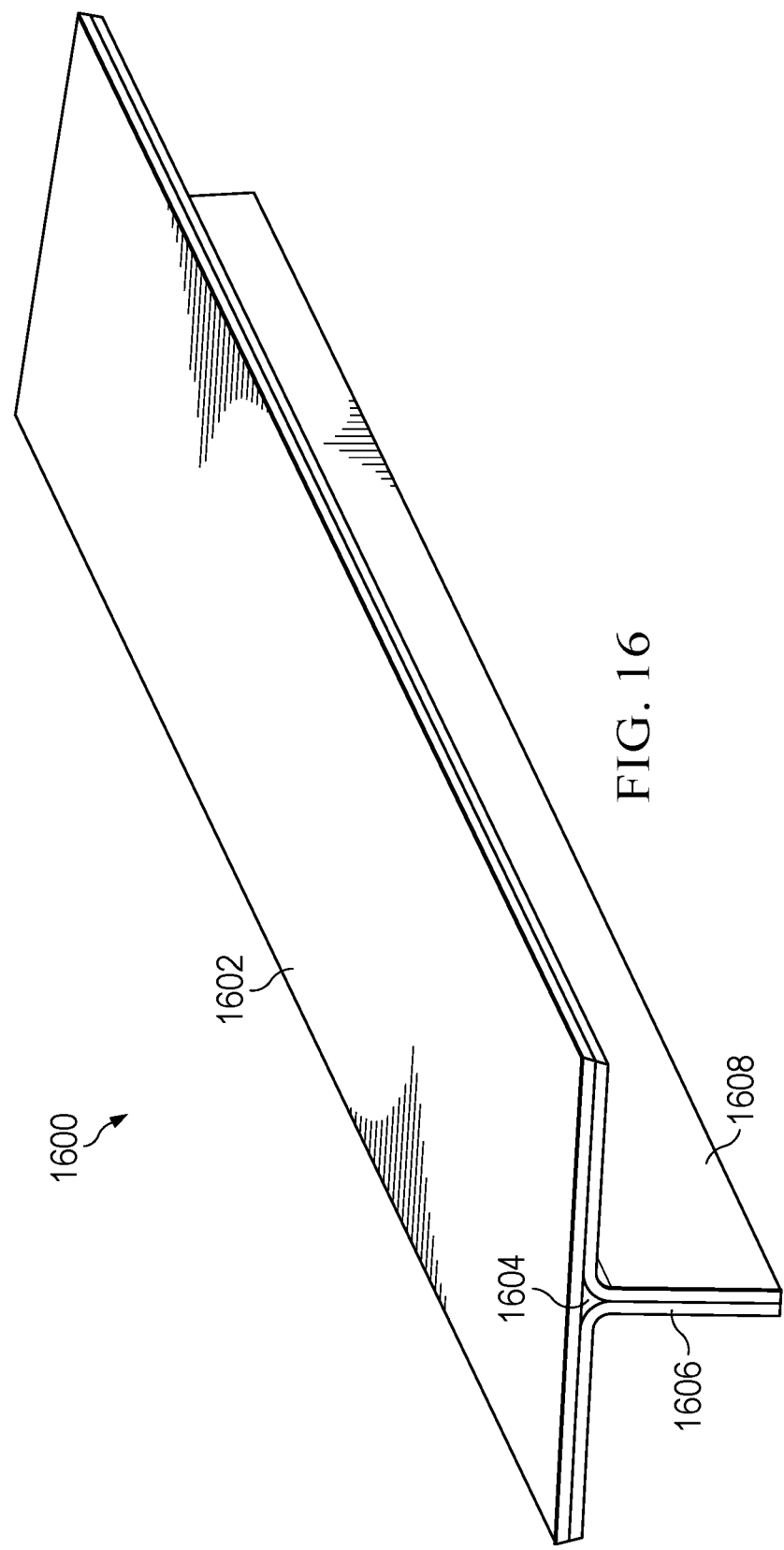
FIG. 16 is a perspective view of a blade stringer in accordance with an illustrative embodiment.

Turning now to FIG. 16, a perspective view of a blade stringer is depicted in accordance with an illustrative embodiment. Blade stringer 1600 can be a portion of aircraft 100 of FIG. 1. Blade stringer 1600 is a physical implementation of blade stringer 276 of FIG. 2. Blade stringer 1600 can be formed by forming and curing tool 202 of FIG. 2. Blade stringer 1600 can be formed and cured by forming and curing tool 301 of FIGS. 3-15.

Blade stringer 1600 is a cured composite component. Each of base 1602, noodle 1604, first L-shaped material 1606, and second L-shaped material 1608 laid up, compacted, and cured together to form blade stringer 1600. Base 1602, first L-shaped material 1606, and second L-shaped material 1608 are formed of fiber sheets infused with resin.

Although blade stringer 1600 appears to be substantially straight, in some illustrative examples, blade stringer 1600 can have a complex curvature. Surface of base 1602 has curvature perpendicular to length, and the length may pitch, roll, or yaw. The complex curvature for a specific blade stringer, such as blade stringer 1600, is based on a location within a platform, such as an aircraft. Different locations for blade stringers within a fuselage of an aircraft will have different complex curvatures.

In some illustrative examples, a cross-section of a blade stringer, such as blade stringer 1600, varies in gauge (thickness). To connect blade stringer 1600 to a skin, base 1602 will contact the skin. The skin may have ply drops to induce profile change.

The complex curvature, and possible non-symmetric flange/blade parts make conventional forming challenging and cure tooling complicated. The forming and curing tool of the illustrative examples make forming of blade stringer 1600 easier. The forming and curing tool of the illustrative examples make curing of blade stringer 1600 less complicated as the same tool is used for both forming and curing.

Figure 17:
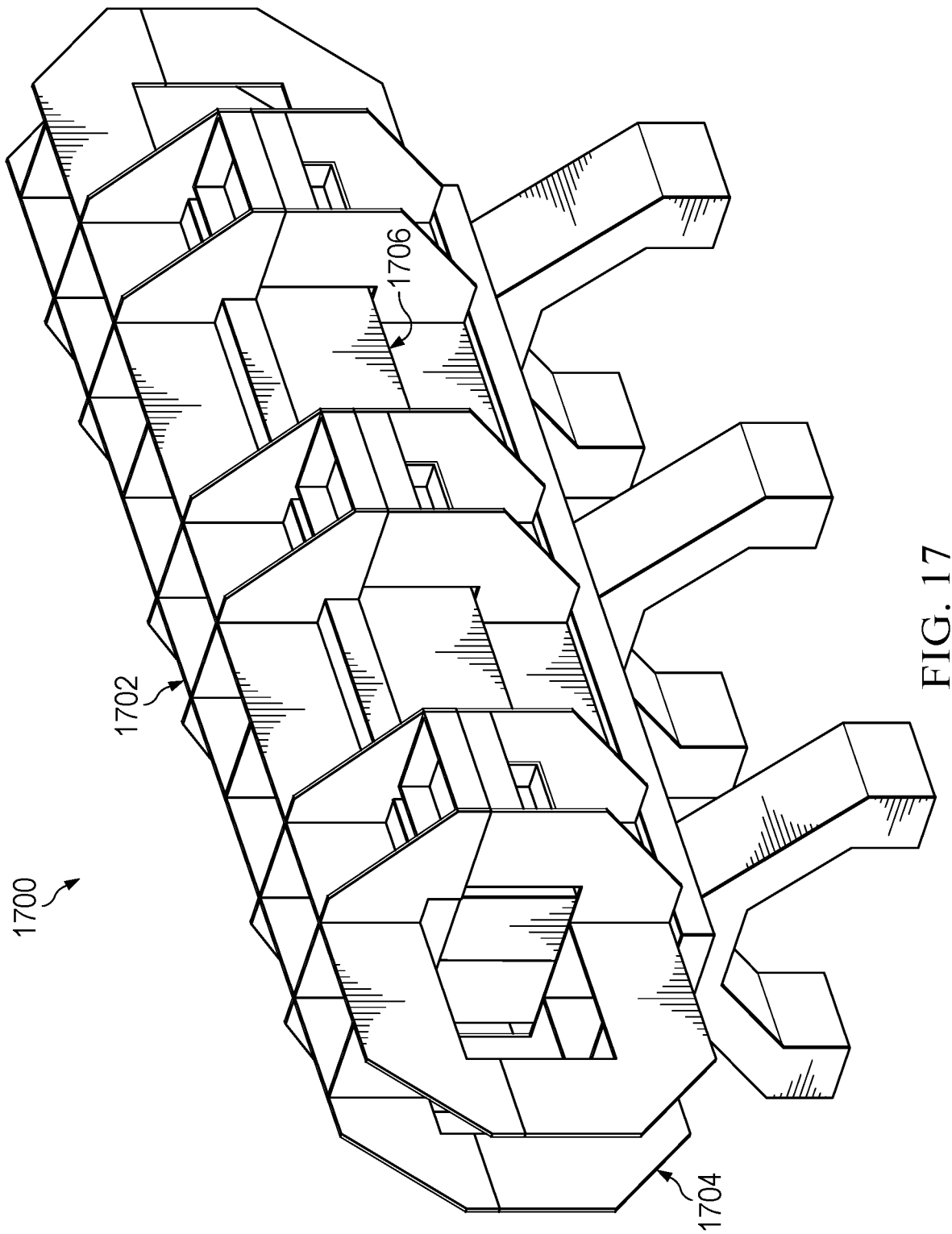
FIG. 17 is an illustration of a perspective view of a press with a forming and curing tool in accordance with an illustrative embodiment.

Turning now to FIG. 17, an illustration of a perspective view of a press with a forming and curing tool is depicted in accordance with an illustrative embodiment. Press 1700 is a physical implementation of press 278 of FIG. 2. Press 1700 can be used to move forming device 602, first die 302, second die 304, first clamp block 306, and second clamp block 308 of FIGS. 3-8. Press 1700 can be used to at least one of move or apply pressure to first die 302, second die 304, and tool lid 902 of FIGS. 9-15. Press 1700 can be used to apply pressure and move tool components to manufacture blade stringer 1600 of FIG. 16.

Press 1700 comprises press top 1702 that provides vertical lifting of the forming device and the tool lid. Press top 1702 also provides vertical pressing of the forming device and the tool lid of forming and curing tool 1706. Press top 1702 provides for forming of the material within forming and curing tool 1706. Press base 1704 holds a first die and a second die of forming and curing tool 1706. Press top 1702 provides for clamping of material by movement of a first clamp block and a second clamp block of forming and curing tool 1706.

Press base 1704 provides for horizontal press opening. Press base 1704 is configured to move a first die and a second die of forming and curing tool 1706. Press base 1704 applies pressure to a first die and a second die of forming and curing tool 1706 to compact the material between the first die and the second die.

Figure 18A:
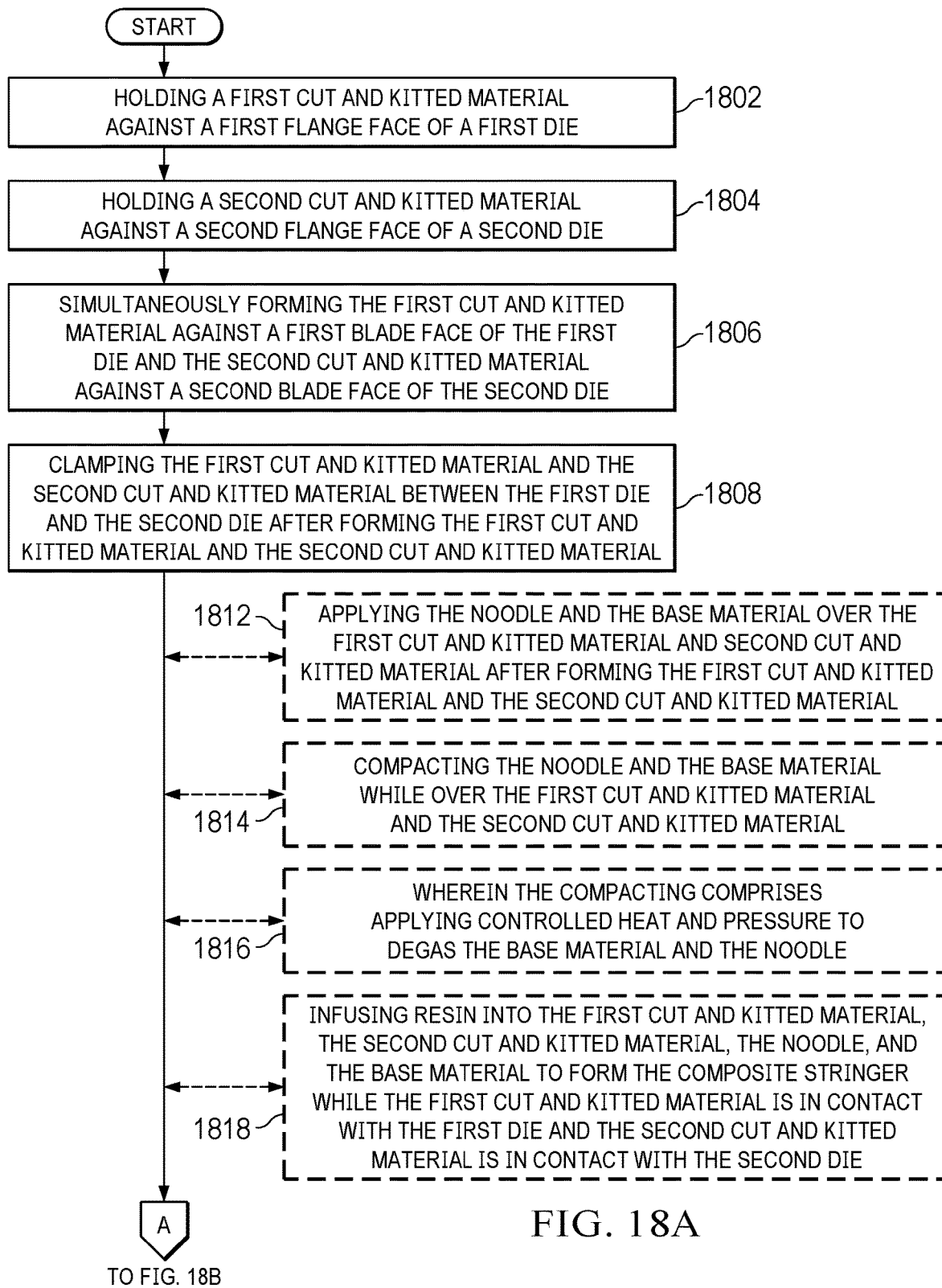

Turning now to FIGS. 18A-18B, a flowchart of a method of forming a blade stringer is depicted in accordance with an illustrative embodiment. Method 1800 can be used to form components of aircraft 100 of FIG. 1. Method 1800 can be performed using forming and curing tool 202 of FIG. 2. Method 1800 can be performed using forming and curing tool 301 of FIGS. 3-15. Method 1800 can be used to form blade stringer 1600 of FIG. 16. Method 1800 can be performed using press 1700 of FIG. 17.

Method 1800 holds a first cut and kitted material against a first flange face of a first die (operation 1802). Method 1800 holds a second cut and kitted material against a second flange face of a second die (operation 1804). Method 1800 simultaneously forms the first cut and kitted material against a first blade face of the first die and the second cut and kitted material against a second blade face of the second die (operation 1806). Method 1800 clamps the first cut and kitted material and the second cut and kitted material between the first die and the second die after forming the first cut and kitted material and the second cut and kitted material (operation 1808). Method 1800 cures a composite stringer preform comprising the first cut and kitted material, the second cut and kitted material, a noodle, and a base material while the composite stringer preform is against the first forming surface and the second forming surface (operation 1810). Afterward, method 1800 terminates.

In some illustrative examples, method 1800 applies the noodle and the base material over the first cut and kitted material and second cut and kitted material after forming the first cut and kitted material and the second cut and kitted material (operation 1812).

In some illustrative examples, method 1800 compacts the noodle and the base material while over the first cut and kitted material and the second cut and kitted material (operation 1814).

In some illustrative examples, the compacting comprises applying controlled heat and pressure to degas the base material and the noodle (operation 1816).

In some illustrative examples, method 1800 infuses resin into the first cut and kitted material, the second cut and kitted material, the noodle, and the base material to form the composite stringer while the first cut and kitted material is in contact with the first die and the second cut and kitted material is in contact with the second die (operation 1818).

In some illustrative examples, infusing resin comprises introducing resin to a curing chamber between the base material and a tool lid of the curing chamber, and forcing the resin into the base material as the tool lid moves towards the base material (operation 1820). In some illustrative examples, simultaneously forming the first cut and kitted material against the first blade face and the second cut and kitted material against the second blade face comprises moving a forming device between the first die and the second die (operation 1822).

In some illustrative examples, simultaneously forming the first cut and kitted material against the first blade face and the second cut and kitted material against the second blade face comprises heating the first cut and kitted material and the second cut and kitted material to a number of temperatures in the range of 120 degrees Fahrenheit to 350 degrees Fahrenheit (operation 1824). The number of temperatures are selected based on the type of material to be formed. In some illustrative examples, heating the first cut and kitted material and the second cut and kitted material comprises heating the first cut and kitted material and the second cut and kitted material using integral heating in a number of dies having the first forming surface and the second forming surface. The integral heating can take any desirable form. In some illustrative examples, the integral heating can comprise at least one of liquid, electric, inductive, or steam heating.

In some illustrative examples, clamping the first cut and kitted material and the second cut and kitted material comprises moving at least one of the first die or the second die towards the other the first die or the second die (operation 1826). In some illustrative examples, at least one of the first die or the second die towards the other the first die or the second die by a press.

In some illustrative examples, curing the composite stringer preform comprises heating the composite stringer preform to a temperature in the range of 250 degrees Fahrenheit and 400 degrees Fahrenheit (operation 1828).

Figure 19A:
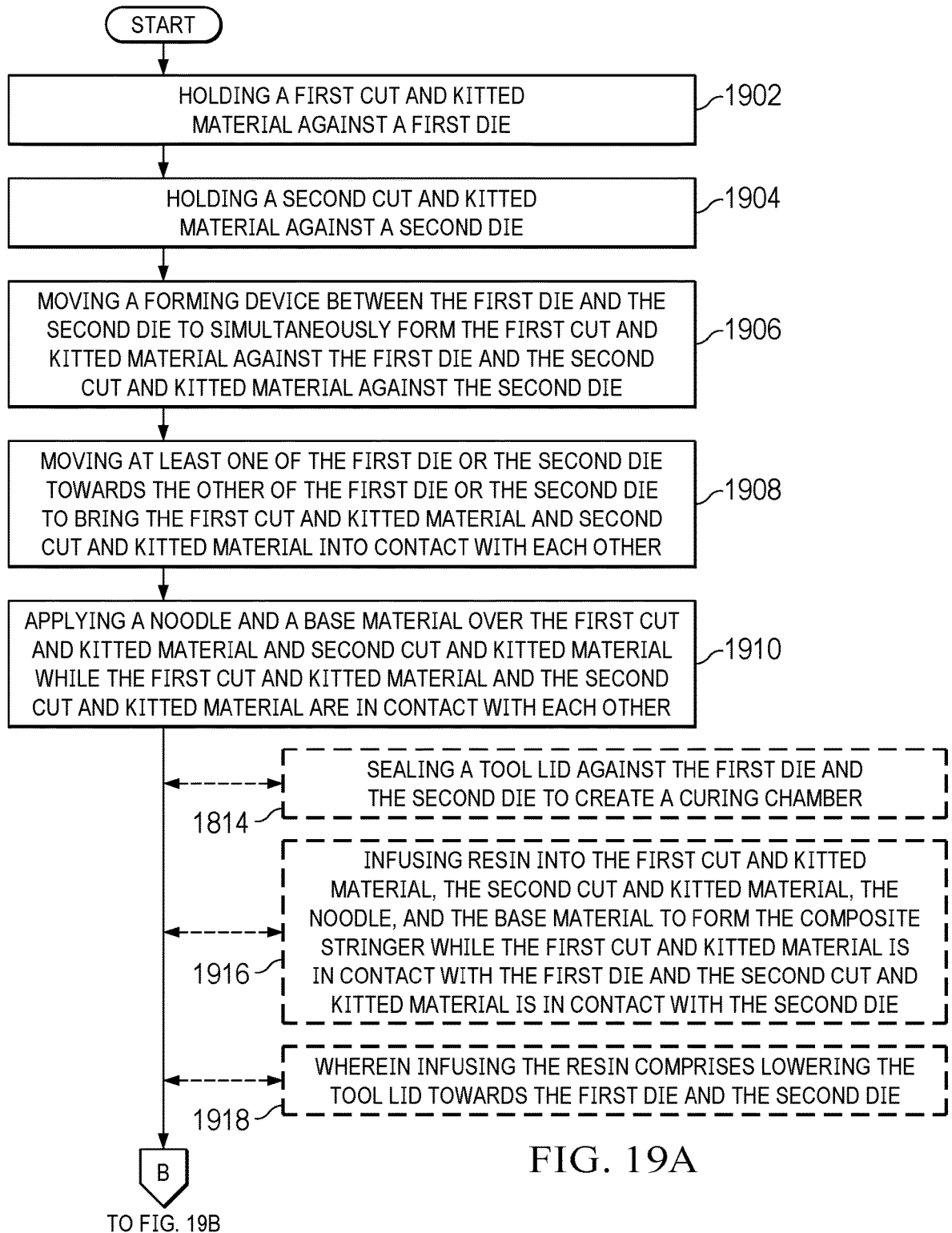

Turning now to FIGS. 19A-19B, a flowchart of a method of forming a blade stringer is depicted in accordance with an illustrative embodiment. Method 1900 can be used to form components of aircraft 100 of FIG. 1. Method 1900 can be performed using forming and curing tool 202 of FIG. 2. Method 1900 can be performed using forming and curing tool 301 of FIGS. 3-15. Method 1900 can be used to form blade stringer 1600 of FIG. 16. Method 1900 can be performed using press 1700 of FIG. 17.

Method 1900 holds a first cut and kitted material against a first die (operation 1902). Method 1900 holds a second cut and kitted material against a second die (operation 1904). Method 1900 moves a forming device between the first die and the second die to simultaneously form the first cut and kitted material against the first die and the second cut and kitted material against the second die (operation 1906). Method 1900 moves at least one of the first die or the second die towards the other of the first die or the second die to bring the first cut and kitted material and second cut and kitted material into contact with each other (operation 1908). Method 1900 applies a noodle and a base material over the first cut and kitted material and second cut and kitted material while the first cut and kitted material and the second cut and kitted material are in contact with each other (operation 1910). Method 1900 cures a composite stringer preform comprising the first cut and kitted material, the second cut and kitted material, the noodle, and the base material while the composite stringer preform is against the first die and the second die (operation 1912). Afterwards, method 1900 terminates.

In some illustrative examples, method 1900 seals a tool lid against the first die and the second die to create a curing chamber (operation 1914). The curing chamber is a space between the tool lid, the first die, and the second die containing the materials to form the blade stringer.

In some illustrative examples, method 1900 infuses resin into the first cut and kitted material, the second cut and kitted material, the noodle, and the base material to form the composite stringer while the first cut and kitted material is in contact with the first die and the second cut and kitted material is in contact with the second die (operation 1916). In these illustrative examples, the forming and curing tool is used for each of forming, resin infusion, and curing.

In some illustrative examples, infusing the resin comprises lowering the tool lid towards the first die and the second die (operation 1918). In some illustrative examples, infusing resin comprises sending resin into the curing chamber through resin inlets in the tool lid (operation 1920).

In some illustrative examples, curing the composite stringer preform comprises heating the composite stringer preform to a temperature in the range of 250 degrees Fahrenheit and 400 degrees Fahrenheit (operation 1922). The curing temperatures are selected based on the type of resin within the composite stringer preform.

In some illustrative examples, method 1900 heats the first cut and kitted material and the second cut and kitted material to a number of temperatures in the range of 120 degrees Fahrenheit to 350 degrees Fahrenheit as the forming device moves between the first die and the second die (operation 1924).

In some illustrative examples, method 1900 compacts the base material and the noodle by applying pressure using a tool lid and heating the base material and the noodle (operation 1926). In some illustrative examples, compacting the noodle and the base material comprises applying heat and controlled pressure selected based on at least one of a type of material, a cross-sectional shape of the blade stringer, or other design characteristics.

Figure 20:
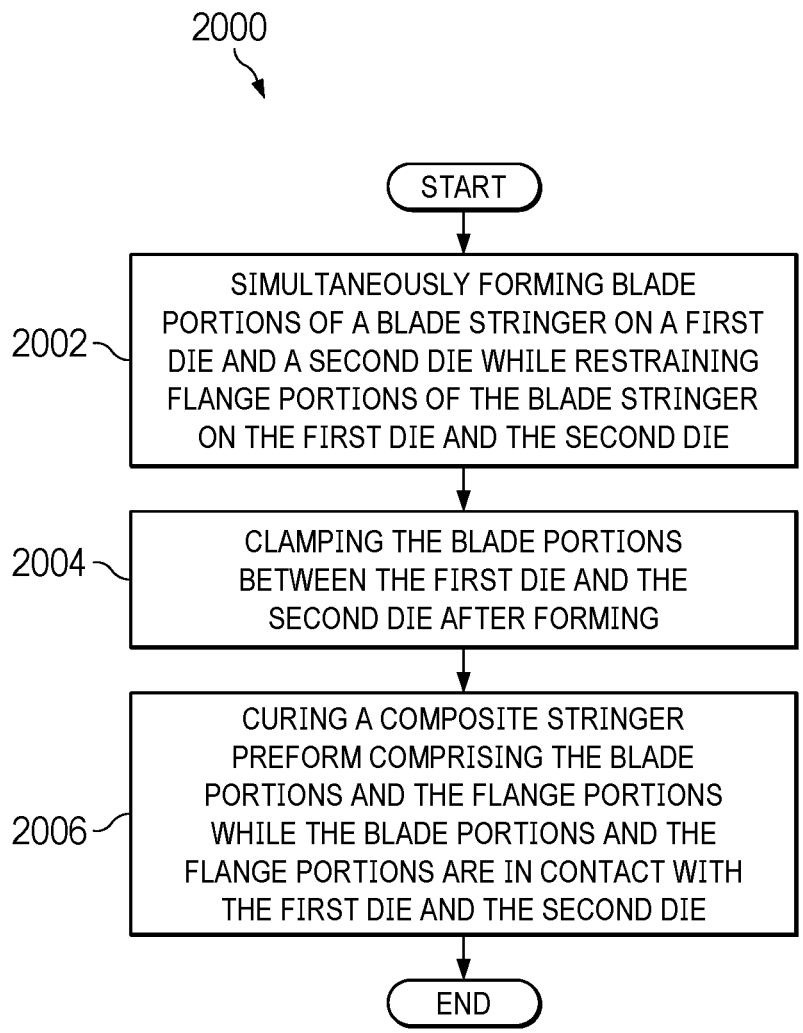
FIG. 20 is a flowchart of a method of forming a blade stringer in accordance with an illustrative embodiment.

Turning now to FIG. 20, a flowchart of a method of forming a blade stringer is depicted in accordance with an illustrative embodiment. Method 2000 can be used to form components of aircraft 100 of FIG. 1. Method 2000 can be performed using forming and curing tool 202 of FIG. 2. Method 2000 can be performed using forming and curing tool 301 of FIGS. 3-15. Method 2000 can be used to form blade stringer 1600 of FIG. 16. Method 2000 can be performed using press 1700 of FIG. 17.

Method 2000 simultaneously forms blade portions of a blade stringer on a first die and a second die while restraining flange portions of the blade stringer on the first die and the second die (operation 2002). Method 2000 clamps the blade portions between the first die and second die after forming (operation 2004). Method 2000 cures a composite stringer preform comprising the blade portions and the flange portions while the blade portions and the flange portions are in contact with the first die and the second die (operation 2006).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1812 through operation 1828 of FIG. 18A-18B, and operation 1914 through operation 1926 of FIGS. 19A-19B may be optional.

Figure 21:
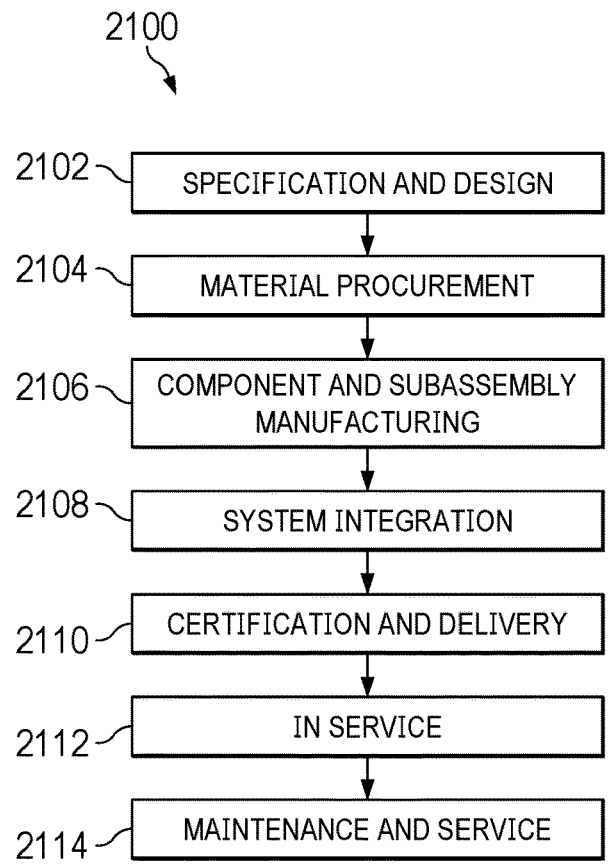
FIG. 21 is an illustration of an aircraft manufacturing and service method in a form of a block diagram in accordance with an illustrative embodiment.
Figure 22:
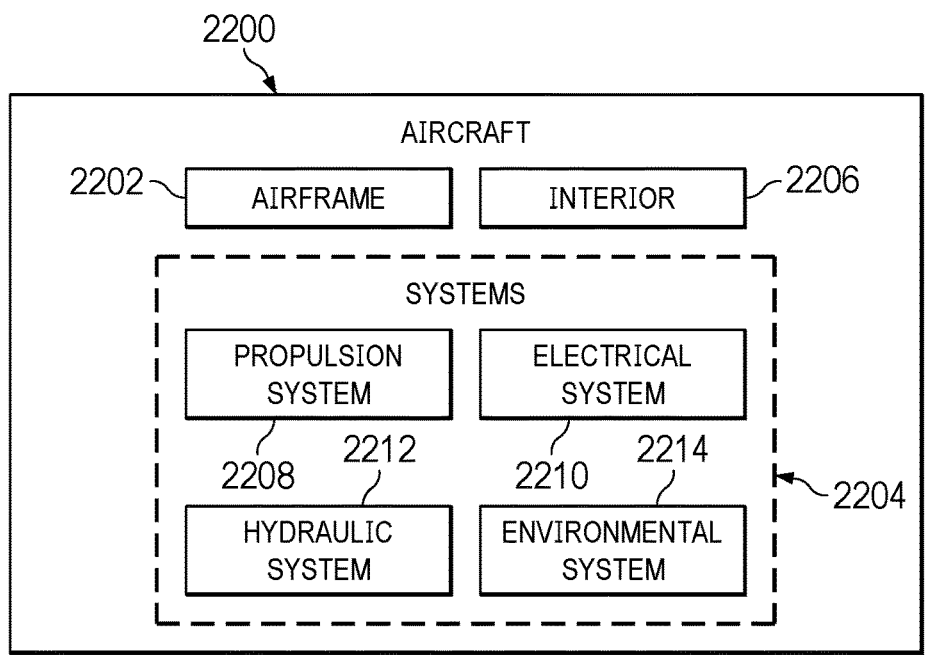
FIG. 22 is an illustration of an aircraft in a form of a block diagram in which an illustrative embodiment may be implemented.

Illustrative embodiments of the present disclosure may be described in the context of aircraft manufacturing and service method 2100 as shown in FIG. 21 and aircraft 2200 as shown in FIG. 22. Turning first to FIG. 21, an illustration of an aircraft manufacturing and service method in a form of a block diagram is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 takes place. Thereafter, aircraft 2200 may go through certification and delivery 2110 in order to be placed in service 2112. While in service 2112 by a customer, aircraft 2200 is scheduled for routine maintenance and service 2114, which may include modification, reconfiguration, refurbishment, or other maintenance and service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft in a form of a block diagram is depicted in which an illustrative embodiment may be implemented. In this example, aircraft 2200 is produced by aircraft manufacturing and service method 2100 of FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included.

Apparatuses and methods embodied herein may be employed during at least one of the stages of aircraft manufacturing and service method 2100. One or more illustrative embodiments may be manufactured or used during at least one of component and subassembly manufacturing 2106, system integration 2108, in service 2112, or maintenance and service 2114 of FIG. 21.

The illustrative examples provide methods to streamline the process to form blade stringers from a flat material stock and the, curing or infusing (for dry fiber resin infusion applications) the stringers. The illustrative examples reduce the number of cells to produce composite stringers by integrating forming and curing/infusion processes into a single cell. Cell equipment is presented which can fabricate different (similar) cells based on tooling design.

The illustrative examples include the automation of the press, to move the tools/dies to the appropriate positions for the process to proceed (opening the dies for forming, closing for infusion/cure). Sealing between the tool surfaces provides vacuum integrity. Control of the heat/temperature of the tools and proper thermal uniformity results in quality parts.

The illustrative examples present integration of the forming and cure cells, and the use of the cure mandrels/tools as the forming dies. Existing methods for fabricating composites stringers have separate forming and curing work positions.

Important technical features include the automated motions control of the press to move the tools to the appropriate locations for the process step (preform setup, forming, curing), indexing of the components to ensure accurate ply placement, indexing of mandrels to each other upon closing, and sealing of the tool once closed. The illustrative examples can use gapped resin infusion stringer fabrication. In other illustrative examples, the forming and curing tool can also be utilized for traditional resin transfer molding (RTM) resin infusion stringer fabrication, thermoset prepreg stringer fabrication, combination thermoset prepreg and resin infusion processes, along with thermoplastics (at higher temperatures). The illustrative examples can be used for the fabrication of stringers (wing, empennage, possible fuselage) for co-bonding applications at high production rates.

The illustrative examples will decrease capital costs associated with new aircraft programs by reducing cell count for stringer forming and curing activities. The illustrative examples utilize common tooling for forming and cure/infusion, in two configurations. The forming configuration comprises two upper forming clamps and two forming dies with a forming device for pressure application. Pressure applied in the forming configuration can be applied using a common press. The cure/infusion configuration comprises a cure/infusion (tool) lid and the two forming dies (to be used as cure mandrels).

Work can be performed in a common press structure/equipment. The press can open/close in vertical and horizontal axis. The horizontal movement can make space for forming. Horizontal and vertical movement can provide pressure during cure/infusion. Vertical pressure can also be used to manipulate forming method.

Between forming and curing, a tool swap is performed for the clamps/lids. In some illustrative examples, the other of the forming device and the tool lid is kept close/on same equipment for flow. In some illustrative examples, the forming clamp, and cure lid could be same tool, with additional sealing.

Pick and Place (PnP) equipment can be used for loading preforms into forming/cure tools. In some illustrative examples, the common press design for similar stringers can control capital costs and provide commonality in production system. A common controller system can be used for out of autoclave cures.

Elevated temperature with pressure is provided for forming and curing. In some illustrative examples, forming temperatures range from 120 F to 350 F. In some illustrative examples, curing temperatures range from 250 F to 400 F. Tools can be heated with any viable method.

A common forming bladder/arm/device moves between the two forming dies, forming both cut and kitted materials at same time. In some illustrative examples, vacuum bag-based forming methods can be used.

Once formed, forming device is retracted, tool is moved together, base charge and noodle are placed, and infusion lid moved into place. After positioning the base charge and the noodle, the base charge and noodle are formed with the tool lid. In some illustrative examples, the tool lid includes infusion features.

For resin infusion, infusion ports and vacuum/resin ports can be present in either lid or tool bases. The tools (dies) are capable of withstanding up to 200 PSI internal pressure while maintaining seal/vacuum integrity and internal surface profile tolerance within 0.010" of nominal.

In the illustrative examples, the first die and the second die are cleaned and loaded into a press. The first clamp block and the second clamp block are loaded into the press. Unformed materials (first cut and kitted material and second cut and kitted material) are placed onto the first die and the second die. The clamps blocks are closed on material.

The first die, the second die, the first clamp block, and the second clamp block are moved into a forming location. The material is brought to a forming temperature. A forming device is used to form the first cut and kitted material and second cut and kitted material into a respective flange portion and a respective blade portion. The forming device is retracted.

The first die and the second die are locked into a cure position. The first clamp block and the second clamp block are removed from the first die and the second die. A noodle and a base material are loaded over the formed first cut and kitted material and the second cut and kitted material.

A forming lid is brought into place. Lid pressure is applied to form the base material, noodle, first cut and kitted material and the second cut and kitted material. The forming and curing tool is preheated. Vacuum degas is applied to the base material, noodle, first cut and kitted material and the second cut and kitted material. The forming and curing tool is brought to infusion/cure temperature. The base material, noodle, first cut and kitted material and the second cut and kitted material are optionally infused and then cured.

After curing, the tool lid, first die and second die are opened. The cured part (blade stringer) is removed.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A forming and curing tool for a blade stringer, the forming and curing tool comprising:
   a first die with a number of first vacuum paths extending through the first die and a first forming surface comprising a first blade face and a first flange face;
   a second die with a number of second vacuum paths extending through the second die and a second forming surface comprising a second blade face facing the first blade face and a second flange face;
   a first clamp block configured to clamp a first cut and kitted material between the first clamp block and the first flange face;
   a second clamp block configured to clamp a second cut and kitted material between the second clamp block and the second flange face;
   a tool lid configured to seal against the first die and the second die to create a curing chamber; and
   a press configured to hold and move the first die, the second die, and the tool lid relative to each other.

2. The forming and curing tool of claim 1, wherein the tool lid comprises a number of resin inlets.

3. The forming and curing tool of claim 1 further comprising:
   a forming device configured to move between the first die and the second die and configured to form the first cut and kitted material against the first blade face and the second cut and kitted material against the second blade face simultaneously.

4. The forming and curing tool of claim 3, wherein the forming device comprises one of a bladder or a forming arm.

5. A forming and curing tool for a blade stringer, the forming and curing tool comprising:
   a first die with a number of first vacuum paths extending through the first die and a first forming surface comprising a first blade face and a first flange face;
   a second die with a number of second vacuum paths extending through the second die and a second forming surface comprising a second blade face facing the first blade face and a second flange face;
   a first clamp block configured to clamp a first cut and kitted material between the first clamp block and the first flange face; and
   a second clamp block configured to clamp a second cut and kitted material between the second clamp block and the second flange face.

6. The forming and curing tool of claim 5 further comprising:
   a tool lid configured to seal against the first die and the second die to create a curing chamber.

7. The forming and curing tool of claim 6, wherein the tool lid comprises a number of resin inlets.

8. The forming and curing tool of claim 5 further comprising:
   a forming device configured to move between the first die and the second die and configured to form the first cut and kitted material against the first blade face and the second cut and kitted material against the second blade face simultaneously.

9. The forming and curing tool of claim 8, wherein the forming device comprises one of a bladder or a forming arm.

10. The forming and curing tool of claim 8 further comprising:
    a press configured to move the forming device relative to the first die and the second die.

11. The forming and curing tool of claim 10, wherein the press is further configured to hold and apply pressure to at least one of the first die, the second die, the first clamp block, or the second clamp block.

12. The forming and curing tool of claim 5 further comprising:
    a press configured to hold and apply pressure to the first die, the second die, the first clamp block, and the second clamp block.

13. The forming and curing tool of claim 12 further comprising:
    a tool lid configured to seal against the first die and the second die to create a curing chamber.

14. A forming and curing tool for a blade stringer, the forming and curing tool comprising:
    a first die with a number of first vacuum paths extending through the first die, a heating system, and a first forming surface comprising a first blade face and a first flange face;
    a second die with a number of second vacuum paths extending through the second die, a heating system, and a second forming surface comprising a second blade face facing the first blade face and a second flange face;
    a first clamp block configured to clamp a first cut and kitted material between the first clamp block and the first flange face;
    a second clamp block configured to clamp a second cut and kitted material between the second clamp block and the second flange face; and
    a tool lid configured to seal against the first die and the second die to create a curing chamber.

15. The forming and curing tool of claim 14, wherein the tool lid is configured to compact a base material against the first die and the second die.

16. The forming and curing tool of claim 14, wherein the tool lid comprises a number of resin inlets.

17. A method of forming a blade stringer, the method comprising:
    holding a first cut and kitted material against a first flange face of a first forming surface of a first die by a first clamp block, the first die comprising a first heating system and a number of first vacuum paths extending therethrough, the first forming surface also comprising a first blade face;
    holding a second cut and kitted material against a second flange face of a second forming surface of a second die by a second clamp block, the second die comprising a second heating system and a number of second vacuum paths extending therethrough, the second forming surface also comprising a second blade face facing the first blade face;
    simultaneously forming the first cut and kitted material against the first blade face of the first die and the second cut and kitted material against the second blade face of the second die;
    clamping the first cut and kitted material and the second cut and kitted material between the first die and the second die after forming the first cut and kitted material and the second cut and kitted material; and
    curing, using a tool lid sealing against the first die and the second die and creating a curing chamber and a press configured to hold and move the first die, the second die, and the tool lid relative to each other, a composite stringer preform comprising the first cut and kitted material, the second cut and kitted material, a noodle, and a base material while the composite stringer preform is against the first flange face and the second flange face.

18. The method of claim 17 further comprising:
applying the noodle and the base material over the first cut and kitted material and second cut and kitted material after forming the first cut and kitted material and the second cut and kitted material.

19. The method of claim 18 further comprising:
compacting the noodle and the base material while over the first cut and kitted material and the second cut and kitted material.

20. The method of claim 19, wherein the compacting comprises applying controlled heat and pressure to degas the base material and the noodle.

21. The method of claim 19 further comprising:
infusing resin into the first cut and kitted material, the second cut and kitted material, the noodle, and the base material to form the composite stringer preform while the first cut and kitted material is in contact with the first die and the second cut and kitted material is in contact with the second die.

22. The method of claim 21, wherein infusing resin comprises introducing resin to the curing chamber between the base material and the tool lid of the curing chamber, and forcing the resin into the base material as the tool lid moves towards the base material.

23. The method of claim 17, wherein simultaneously forming the first cut and kitted material against the first blade face and the second cut and kitted material against the second blade face comprises moving a forming device between the first die and the second die.

24. The method of claim 17, wherein simultaneously forming the first cut and kitted material against the first blade face and the second cut and kitted material against the second blade face comprises heating the first cut and kitted material and the second cut and kitted material to a number of temperatures in a range of 120 degrees Fahrenheit to 350 degrees Fahrenheit.

25. The method of claim 17, wherein clamping the first cut and kitted material and the second cut and kitted material comprises moving at least one of the first die or the second die towards the other of the first die or the second die.

26. The method of claim 17, wherein curing the composite stringer preform comprises heating the composite stringer preform to a temperature in a range of 250 degrees Fahrenheit and 400 degrees Fahrenheit.

27. A method of forming a blade stringer comprising:
holding a first cut and kitted material by a first clamp block against a first die comprising: a first heating system, a number of first vacuum paths extending therethrough, and a first forming surface comprising a first blade face and a first flange face;
holding a second cut and kitted material by a second clamp block against a second die comprising: a second heating system, a number of second vacuum paths extending therethrough, and a second forming surface comprising a second blade face facing the first blade face and a second flange face;
moving a forming device between the first die and the second die to simultaneously form the first cut and kitted material against the first die and the second cut and kitted material against the second die;
moving, using a press configured to hold and move the first die, the second die, and a tool lid relative to each other, at least one of the first die or the second die towards the other of the first die or the second die to bring the first cut and kitted material and second cut and kitted material into contact with each other, the tool lid sealing against the first die and the second die and creating a curing chamber;
applying a noodle and a base material over the first cut and kitted material and second cut and kitted material while the first cut and kitted material and the second cut and kitted material are in contact with each other; and
curing, using the tool lid, a composite stringer preform comprising the first cut and kitted material, the second cut and kitted material, the noodle, and the base material while the composite stringer preform is against the first die and the second die.

28. The method of claim 27, further comprising the tool lid, the first die, or the second die comprising a number of seals.

29. The method of claim 28 further comprising:
infusing resin into the first cut and kitted material, the second cut and kitted material, the noodle, and the base material to form the composite stringer preform while the first cut and kitted material is in contact with the first die and the second cut and kitted material is in contact with the second die.

30. The method of claim 29, wherein infusing the resin comprises lowering the tool lid towards the first die and the second die.

31. The method of claim 29, wherein infusing resin comprises sending resin into the curing chamber through resin inlets in the tool lid.

32. The method of claim 27, wherein curing the composite stringer preform comprises heating the composite stringer preform to a temperature in a range of 250 degrees Fahrenheit and 400 degrees Fahrenheit.

33. The method of claim 27 further comprising:
heating the first cut and kitted material and the second cut and kitted material to a number of temperatures in a range of 120 degrees Fahrenheit to 350 degrees Fahrenheit as the forming device moves between the first die and the second die.

34. The method of claim 27 further comprising:
compacting the base material and the noodle by applying pressure using the tool lid and heating the base material and the noodle.

35. A method of forming a blade stringer, the method comprising:
simultaneously forming blade portions of a blade stringer on a first die and a second die while restraining, using a first clamp block and a second clamp block, respectively, flange portions of the blade stringer on the first die and the second die, the first die comprising: a first heating system, a number of first vacuum paths extending therethrough, and a first forming surface comprising a first blade face and a first flange face, and the second die comprising: a second heating system, a number of second vacuum paths extending therethrough, and a second forming surface comprising a second blade face facing the first blade face and a second flange face;
clamping, using a press configured to hold and move the first die, the second die, and a tool lid relative to each other, the blade portions between the first die and second die after the simultaneous forming, the tool lid sealing against the first die and the second die and creating a curing chamber; and
curing, using the tool lid, a composite stringer preform comprising the blade portions and the flange portions while the blade portions and the flange portions are in contact with the first die and the second die.

\* \* \* \* \*